United States Patent
Blonde et al.

(10) Patent No.: US 10,762,612 B2
(45) Date of Patent: Sep. 1, 2020

(54) METHOD AND AN APPARATUS FOR GENERATING DATA REPRESENTATIVE OF A PIXEL BEAM

(71) Applicant: THOMSON Licensing, Issy-les-Moulineaux (FR)

(72) Inventors: Laurent Blonde, Thorigné- Fouillard (FR); Valter Drazic, Betton (FR); Mozhdeh Seifi, Thorigne-Fouillard (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 99 days.

(21) Appl. No.: 16/067,260

(22) PCT Filed: Dec. 29, 2016

(86) PCT No.: PCT/EP2016/082853
§ 371 (c)(1),
(2) Date: Jun. 29, 2018

(87) PCT Pub. No.: WO2017/114904
PCT Pub. Date: Jul. 6, 2017

(65) Prior Publication Data
US 2019/0295232 A1 Sep. 26, 2019

(30) Foreign Application Priority Data
Dec. 30, 2015 (EP) .................................... 15307174

(51) Int. Cl.
*G06T 5/00* (2006.01)
*G06T 5/50* (2006.01)
(Continued)

(52) U.S. Cl.
CPC ................ *G06T 5/50* (2013.01); *G06T 15/06* (2013.01); *G06T 15/506* (2013.01); *G06T 19/20* (2013.01);
(Continued)

(58) Field of Classification Search
CPC ......... G06T 5/50; G06T 15/06; G06T 15/506; G06T 19/20; G06T 2200/21; G06T 2207/10052
See application file for complete search history.

(56) References Cited

U.S. PATENT DOCUMENTS 5,243,619 A * 9/1993 Albers ..................... G02B 3/06
 359/489.09
6,222,679 B1 4/2001 Nevis
(Continued)

FOREIGN PATENT DOCUMENTS

EP 3144887 A1 * 3/2017 ............... G06T 5/50

OTHER PUBLICATIONS

Gong et al., "Observation of the asymmetric Bessel beams with arbitrary orientation using a digital micromirror device", Optics Express, vol. 22, No. 22, 3 Nov. 2014, pp. 26763-26776.
(Continued)

*Primary Examiner* — Khai M Nguyen
(74) *Attorney, Agent, or Firm* — Robert D. Shedd

(57) ABSTRACT

There are several types of plenoptic devices and camera arrays available on the market, and all these light field acquisition devices have their proprietary file format. However, there is no standard supporting the acquisition and transmission of multi-dimensional information. It is interesting to obtain information related to a correspondence between pixels of a sensor of said optical acquisition system and an object space of said optical acquisition system. Indeed, knowing which portion of the object space of an optical acquisition system a pixel belonging to the sensor of said optical acquisition system is sensing enables the improvement of signal processing operations. The notion of pixel beam, which represents a volume occupied by a set of rays of light in an object space of an optical system of a camera along with a compact format for storing such information is thus introduce.

13 Claims, 14 Drawing Sheets

(51) Int. Cl.
*G06T 15/06* (2011.01)
*G06T 15/50* (2011.01)
*G06T 19/20* (2011.01)

(52) U.S. Cl.
CPC ............... *G06T 2200/21* (2013.01); *G06T 2207/10052* (2013.01)

(56) References Cited

U.S. PATENT DOCUMENTS

| | | | | |
|---|---|---|---|---|
| 2004/0239653 | A1* | 12/2004 | Stuerzlinger | G06F 3/038 345/183 |
| 2010/0316251 | A1* | 12/2010 | Cowburn | G03G 21/046 382/100 |
| 2014/0146201 | A1 | 5/2014 | Knight et al. | |
| 2015/0177062 | A1* | 6/2015 | Nishiyama | G01J 1/4257 702/150 |
| 2019/0101765 | A1* | 4/2019 | Blonde | G02B 6/10 |

OTHER PUBLICATIONS

Anonymous, "An Experimental Plenoptic Camera", http://cameramaker.se/plenoptic.htm, Jan. 2016, pp. 1-2.
Levin et al., "Understanding camera trade-offs through a Bayesian analysis of light field projections", 10th European Conference on Computer Vision (ECCV), Marseille, France, Oct. 12, 2008, pp. 88-101.
Park et al., "Light ray field capture using focal plane sweeping and its optical reconstruction using 3D displays", Optics Express, vol. 22, No. 21, Oct. 20, 2014, pp. 25444-25454.
Ng, R., "Digital Light Field Photography", Stanford University, Department of Computer Science, Doctoral Dissertation, Jul. 2006, pp. 1-203.
Wanner et al., "Generating EPI Representations of 4D Light Fields with a Single Lens Focused Plenoptic Camera", 7th International Symposium on Visual Computing (ISVC 2011), Las Vegas, Nevada, USA, Sep. 26, 2011, pp. 90-101.
Georgiev et al., "Lytro camera technology: theory, algorithms, performance analysis", Proceedings of SPIE, vol. 8667, Feb. 26, 2013, pp. 1-10.

* cited by examiner

METHOD AND AN APPARATUS FOR GENERATING DATA REPRESENTATIVE OF A PIXEL BEAM

This application claims the benefit, under 35 U.S.C. § 365 of International Application PCT/EP2016/082853, filed Dec. 29, 2016, which was published in accordance with PCT Article 21(2) on Jul. 6, 2017, in English, and which claims the benefit of European Patent Application No. 15307174.1, filed on Dec. 30, 2015.

TECHNICAL FIELD

The invention lies in the field of computational. More precisely, the invention relates to a representation format that can be used for transmission, rendering, proceedings of light-field data.

BACKGROUND

A light field represents the amount of light passing through each point of a three-dimensional (3D) space along each possible direction. It is modelled by a function of seven variables representing radiance as a function of time, wavelength, position and direction. In Computer Graphics, the support of light field is reduced to four-dimensional (4D) oriented line space.

The acquisition of 4D light-field data, which can be viewed as a sampling of a 4D light field, i.e. the recording of light rays, is explained in the article "*Understanding camera trade-offs through a Bayesian analysis of light field projections*" by Anat Levin and al., published in the conference proceedings of ECCV 2008 is an hectic research subject.

Compared to classical two-dimensional or 2D images obtained from a conventional camera, 4D light-field data enable a user to have access to more post-processing features that enhance the rendering of images and the interactivity with the user. For example, with 4D light-field data, it is possible to perform refocusing of images with freely selected distances of focalization meaning that the position of a focal plane can be specified/selected a posteriori, as well as changing slightly the point of view in the scene of an image. In order to acquire 4D light-field data, several techniques can be used. For example, a plenoptic camera is able to acquire 4D light-field data. Details of the architecture of a plenoptic camera are provided in FIG. 1A. FIG. 1A is a diagram schematically representing a plenoptic camera 100. The plenoptic camera 100 comprises a main lens 101, a microlens array 102 comprising a plurality of micro-lenses 103 arranged in a two-dimensional array and an image sensor 104.

Another way to acquire 4D light-field data is to use a camera array as depicted in FIG. 1B. FIG. 1B represents a multi-array camera 110. The multi-array camera 110 comprises a lens array 112 and an image sensor 114.

In the example of the plenoptic camera 100 as shown in FIG. 1A, the main lens 101 receives light from an object (not shown on the figure) in an object field of the main lens 101 and passes the light through an image field of the main lens 101.

At last, another way of acquiring a 4D light field is to use a conventional camera that is configured to capture a sequence of 2D images of a same scene at different focal planes. For example, the technique described in the document "Light ray field capture using focal plane sweeping and its optical reconstruction using 3D displays" by J.-H. Park et al., published in OPTICS EXPRESS, Vol. 22, No. 21, in October 2014, may be used to achieve the acquisition of 4D light field data by means of a conventional camera.

There are several ways to represent 4D light-field data. Indeed, in the Chapter 3.3 of the Ph.D dissertation thesis entitled "Digital Light Field Photography" by Ren Ng, published in July 2006, three different ways to represent 4D light-field data are described. Firstly, 4D light-field data can be represented, when recorded by a plenoptic camera by a collection of micro-lens images. 4D light-field data in this representation are named raw images or raw 4D light-field data. Secondly, 4D light-field data can be represented, either when recorded by a plenoptic camera or by a camera array, by a set of sub-aperture images. A sub-aperture image corresponds to a captured image of a scene from a point of view, the point of view being slightly different between two sub-aperture images. These sub-aperture images give information about the parallax and depth of the imaged scene. Thirdly, 4D light-field data can be represented by a set of epipolar images see for example the article entitled: "Generating EPI Representation of a 4 D Light Fields with a Single Lens Focused Plenoptic Camera", by S. Wanner and al., published in the conference proceedings of ISVC 2011.

Light-field data can take up large amounts of storage space, up to several Tera Bytes (TB), which can make storage cumbersome and processing less efficient. In addition light-field acquisition devices are extremely heterogeneous. Light-field cameras are of different types, for example plenoptic or camera arrays. Within each type there are many differences such as different optical arrangements, or micro-lenses of different focal length sand, above all, each camera has its own proprietary file format. At present there is no standard supporting the acquisition and transmission of multi-dimensional information for an exhaustive over-view of the different parameters upon which a light-field depends. As such, acquired light-field data for different cameras have a diversity of formats. The present invention has been devised with the foregoing in mind.

SUMMARY OF INVENTION

According to a first aspect of the invention there is provided a computer implemented method for generating a set of data representative of a volume in an object space of an optical acquisition system occupied by a set of rays of light that at least one pixel of a sensor of said optical acquisition system can sense through a pupil of said optical acquisition system, said volume being called a pixel beam, comprising:

computing a first rotation angle of a first straight line describing a surface of a hyperboloid of one sheet representing the pixel beam, called first generating ray, around a second straight line being a revolution axis of the hyperboloid, said rotation transforming the first generating ray into a second generating ray crossing a reference straight line, computing a second rotation angle of a third straight line describing the surface of the hyperboloid, called third generating ray, around the revolution axis of the hyperboloid, said rotation transforming the third generating ray into a fourth generating ray crossing the reference straight line, computing a distance between one of the second or the fourth generating ray and the revolution axis of the hyperboloid, generating a set of data representative of the pixel beam comprising parameters representative of the second generating ray, parameters representative of the fourth generating ray and the distance between one of the second or the fourth generating ray and the revolution axis of the hyperboloid.

A pixel beam is defined as a pencil of rays of light that reaches a given pixel of a sensor of an optical acquisition system when propagating through the optical system of the optical acquisition system. A pixel beam is represented by a hyperboloid of one sheet. A hyperboloid of one sheet is a ruled surface that supports the notion of pencil of rays of light and is compatible with the notion of the "étendue" of physical light beams.

"Etendue" is a property of light in an optical system which characterizes how "spread out" the light is in area and angle.

From a source point of view, the "étendue" is the product of the area of the source and are solid angle that an optical system's entrance pupil subtends as seen from the source. Equivalently, from the optical system point of view, the "étendue" equals the area of the entrance pupil times the solid angle the source subtends as seen from the pupil.

One distinctive feature of the "étendue" is that it never decreases in any optical system. The "étendue" is related to the Lagrange invariant and the optical invariant, which share the property of being constant in an ideal optical system. The radiance of an optical system is equal to the derivative of the radiant flux with respect to the "étendue".

It is an advantage to represent 4D light-field data using pixel beams because the pixel beams convey per se information related to the "étendue".

4D light-field data may be represented by a collection of pixel beams which can take up large amounts of storage space since pixel beams may be represented by six to ten parameters. A compact representation format for 4D light-field data developed by the inventors of the present invention relies on a ray-based representation of the plenoptic function. This compact representation format requires the rays to be sorted in a way that is not random. Indeed, since rays are mapped along lines, it is efficient, in terms of compactness, to store in sequence the parameters of a given line, i.e. the slope related and the intercept, along with the collection of rays belonging to said given line and then a next line and so on.

Pixel beams may be represented by two rays, called generating rays, describing a surface of the hyperboloid representing the pixel beam. Generating rays may suffer strong deviations while passing through the microlenses of the optical acquisition system and thus hit the main lens of the optical acquisition system at larger aperture angles. Aberrations like distortion may thus disturb the collection of generating rays making the use of the compact representation format less efficient.

The method according to an embodiment of the invention consists in sorting the pairs of generating rays defining the pixel beams of a collection of pixel beams in order to reduce the randomness in position and orientation in order to make the use of the compact representation format more efficient.

Furthermore, the method according to an embodiment of the invention constrains the pairs of generating rays defining the pixels beams of a collection of pixel beams in such a way that one of the parameters representing a pixel beam becomes implicit enabling to reduce the dimensions of the data set representing said pixel beam by one dimension thus contributing to the compactness of the compact representation format.

According to another aspect of the invention, the reference straight line is parallel to an optical axis of a main lens of the optical acquisition system.

It is interesting to choose a reference straight line parallel to the optical axis of the main lens since the optical axis of the main lens is a symmetry axis to the optical acquisition system.

According to another aspect of the invention, the reference straight line is parallel to a central axis of a lens-array of the optical acquisition system.

It is interesting to choose a reference straight line parallel to the optical axis of the lens-array since the optical axis of the lens-array is a symmetry axis to the optical acquisition system.

According to another aspect of the invention, computing the first, respectively the second, rotation angle consists in:
  computing coordinates of a vector defining the second, respectively the fourth, generating ray by multiplying a vector defining the first, respectively the third, generating ray with a rotation matrix,
  the distance between the second, respectively the fourth, generating ray and the reference straight line being equal to zero since said second, respectively fourth, generating ray and said reference straight line cross each other, computing the value of the first, respectively the second, rotation angle based on the points and vectors defining said second, respectively fourth, generating ray and said reference straight line.

According to another aspect of the invention, the second and the fourth generating rays are sorted, prior to the generation of the set of data representative of the pixel beam, so that the first and the second rotation angles are arranged in increasing order.

Arranging the second and the fourth generating rays so that the rotation angles in increasing order makes easier the reconstruction of a pixel beam by a rendering device, such as a television set, a smartphone, a tablet, a personal computer, a laptop, etc. by constraining the direction of cross products vectors involved in the computation of the set of data representative of the pixel beam to be reconstructed.

According to another aspect of the invention, the computed distance between one of the second or the fourth generating ray and the revolution axis of the hyperboloid is the shortest distance between one of the second or the fourth generating ray and the revolution axis of the hyperboloid.

The shortest distance between one the second or the fourth generating ray and the revolution axis of the hyperboloid corresponds to the waist of the pixel beam, i.e. the smallest section of the hyperboloid representing the pixel beam.

According to a second aspect of the invention there is provided an apparatus for generating a set of data representative of a volume in an object space of an optical acquisition system occupied by a set of rays of light that at least one pixel of a sensor of said optical acquisition system can sense through a pupil of said optical acquisition system, said volume being called a pixel beam, said apparatus comprising a processor configured to:
  compute a first rotation angle of a first straight line describing a surface of a hyperboloid of one sheet representing the pixel beam, called first generating ray, around a second straight line being a revolution axis of the hyperboloid, said rotation transforming the first generating ray into a second generating ray crossing a reference straight line,
  computing a second rotation angle of a third straight line describing the surface of the hyperboloid, called third generating ray, around the revolution axis of the hyperboloid, said rotation transforming the third generating ray into a fourth generating ray crossing the reference straight line, compute a distance between one of the second or the fourth generating ray and the revolution axis of the hyperboloid, generate a set of data representative of the pixel beam comprising parameters representative of the second generating ray, parameters representative of the fourth generating ray and the distance between one of the second or the fourth generating ray and the revolution axis of the hyperboloid.

Such an apparatus may be embedded in an optical acquisition system such as a plenoptic camera or any other device such as smartphones, laptop, personal computers, tablets, etc.

According to another aspect of the invention, the processor is configured to compute the first, respectively the second, rotation angle by:

computing coordinates of a vector defining the second, respectively the fourth, generating ray by multiplying a vector defining the first, respectively the third, generating ray with a rotation matrix, the distance between the second, respectively the fourth, generating ray and the reference straight line being equal to zero since said second, respectively fourth, generating ray and said reference straight line cross each other, computing the value of the first, respectively the second, rotation angle based on the vectors defining said second, respectively fourth, generating ray and said reference straight line.

According to a third aspect of the invention there is provided a method for rendering a light-field content comprising.

computing coordinates of a first straight line being a revolution axis of a hyperboloid of one sheet representing a volume in an object space of an optical acquisition system occupied by a set of rays of light that at least one pixel of a sensor of said optical acquisition system can sense through a pupil of said optical acquisition system, said volume being called a pixel beam, using a distance between said revolution axis of the hyperboloid and a second straight line describing a surface of the hyperboloid, called first generating ray, crossing a reference straight line, computing the pixel beam using the coordinates of the revolution axis of the hyperboloid and parameters representative of the first generating ray and parameters of a third straight line describing a surface of the hyperboloid, called second generating ray, crossing the reference straight line, rendering said light-field content.

According to a fourth aspect of the invention there is provided advice for rendering a light-field content, comprising a processor configured to:

compute coordinates of a first straight line being a revolution axis of a hyperboloid of one sheet representing a volume in an object space of an optical acquisition system occupied by a set of rays of light that at least one pixel of a sensor of said optical acquisition system can sense through a pupil of said optical acquisition system, said volume being called a pixel beam, using a distance between said revolution axis of the hyperboloid and a second straight line describing a surface of the hyperboloid, called first generating ray, crossing a reference straight line, compute the pixel beam using the coordinates of the revolution axis of the hyperboloid and parameters representative of the first generating ray and parameters of a third straight line describing a surface of the hyperboloid, called second generating ray, crossing the reference straight line, and said device further comprising a display for rendering said light-field content.

Such a device capable of rendering a light field content may be a television set, a smartphone, a laptop, a personal computer, a tablet, etc.

According to a fifth aspect of the invention there is provided a light field imaging device comprising:

an array of micro lenses arranged in a regular lattice structure;

a photosensor configured to capture light projected on the photosensor from the array of micro lenses, the photosensor comprising sets of pixels, each set of pixels being optically associated with a respective micro lens of the array of micro lenses; and a device for providing metadata in accordance with the device according to the second aspect of the invention.

Such a light field imaging device is for example a plenoptic camera.

According to a sixth aspect of the invention there is provided a signal representative of a light-field content comprising a set of data representative of a volume in an object space of an optical acquisition system occupied by a set of rays of light that at least one pixel of a sensor of said optical acquisition system can sense through a pupil of said optical acquisition system, said volume being called a pixel beam, the set of data representative of the pixel beam comprising:

parameters representative of a first straight line describing a surface of a hyperboloid of one sheet representing the pixel beam, called first generating ray; crossing a reference straight line, parameters representative of a second straight line describing a surface of the hyperboloid, called second generating ray; crossing the reference straight line, a distance between a revolution axis of the hyperboloid and one of the first or the second generating rays.

Some processes implemented by elements of the invention may be computer implemented. Accordingly, such elements may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, such elements may take the form of a computer program product embodied in any tangible medium of expression having computer usable program code embodied in the medium.

Since elements of the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION

As will be appreciated by one skilled in the art, aspects of the present principles can be embodied as a system, method or computer readable medium. Accordingly, aspects of the present principles can take the form of an entirely hardware embodiment, an entirely software embodiment, (including firmware, resident software, micro-code, and so forth) or an embodiment combining software and hardware aspects that can all generally be referred to herein as a "circuit", "module", or "system". Furthermore, aspects of the present principles can take the form of a computer readable storage medium. Any combination of one or more computer readable storage medium (a) may be utilized.

Embodiments of the invention provide formatting of light-field data for further processing applications such as format conversion, refocusing, viewpoint change and 3D image generation.

Figure 2A:
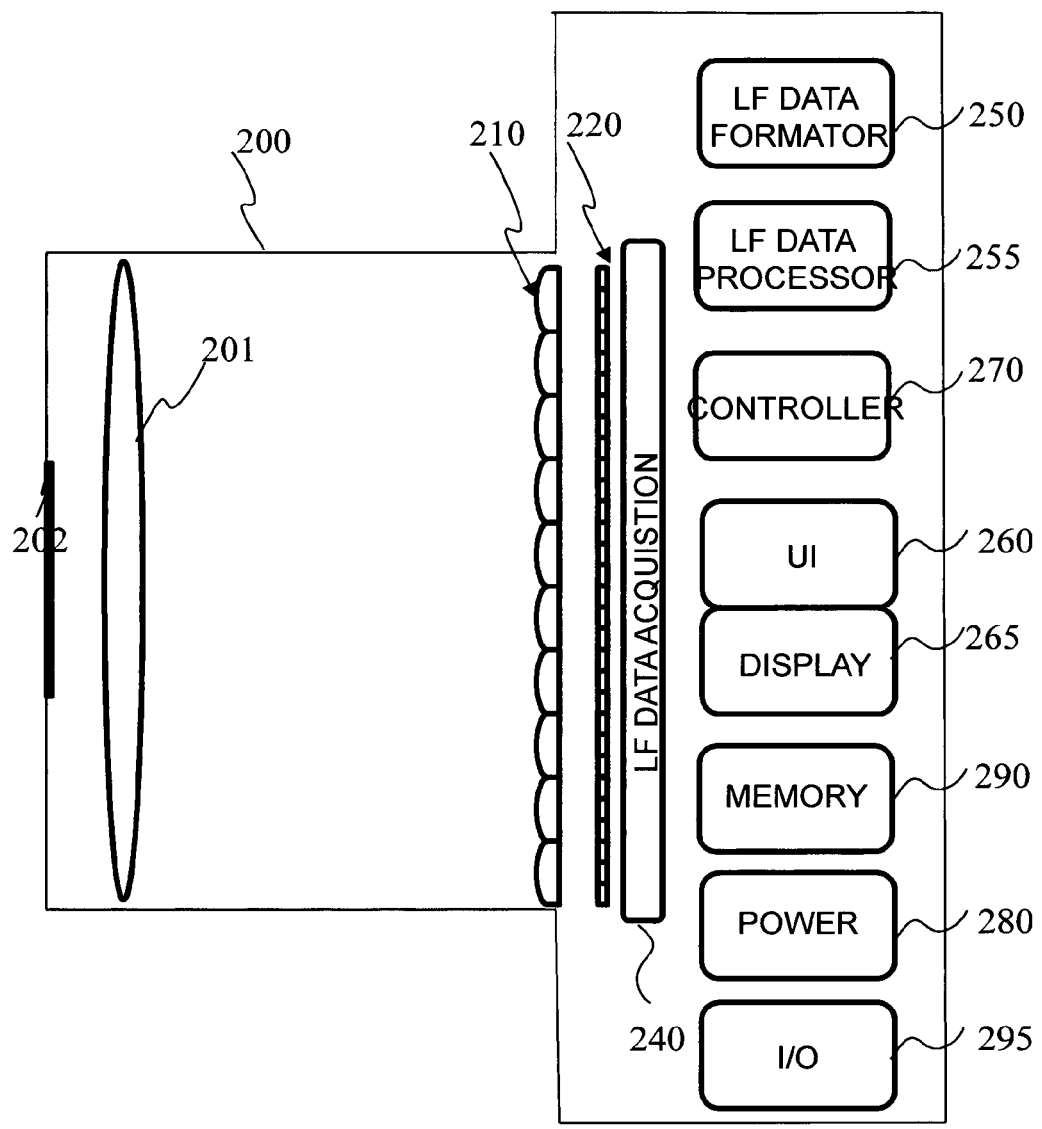
FIG. 2A is a functional diagram of a light-field camera according to an embodiment of the invention.

FIG. 2A is a block diagram of a light-field camera device in accordance with an embodiment of the invention.

Figure 1A:
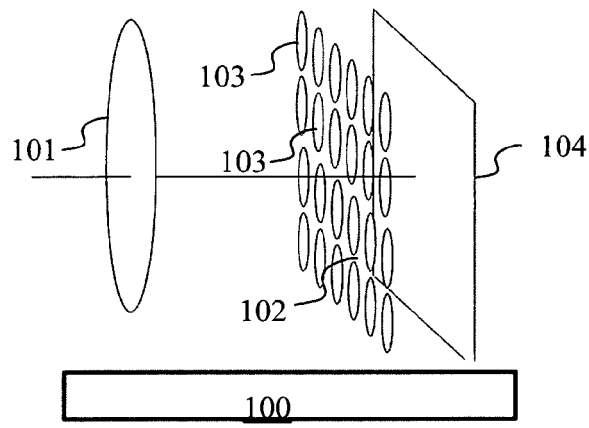
FIG. 1A is a diagram schematically representing a plenoptic camera.
Figure 1B:
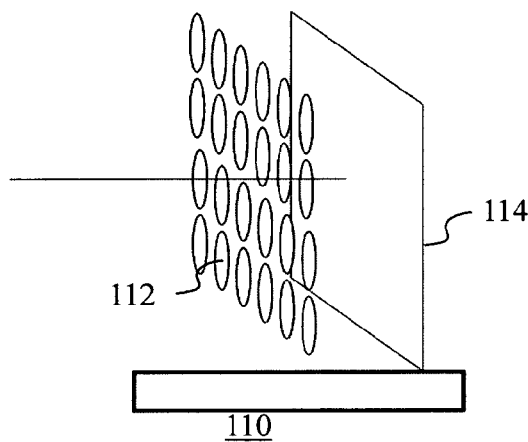
FIG. 1B represents a multi-array camera.

The light-field camera comprises an aperture/shutter 202, a main (objective) lens 201, a micro lens array 210 and a photosensor array 220 in accordance with the light-field camera of FIG. 1A. In some embodiments the light-field camera includes a shutter release that is activated to capture a light-field image of a subject or scene. It will be appreciated that the functional features may also be applied to the light-field camera of FIG. 1B.

The photosensor array 220 provides light-field image data which is acquired by LF Data acquisition module 240 for generation of a light-field data format by light-field data formatting module 250 and/or for processing by light-field data processor 255. Light-field data may be stored, after acquisition and after processing, in memory 290 in a raw data format, as sub aperture images or focal stacks, or in a light-field data format in accordance with embodiments of the invention.

In the illustrated example, the light-field data formatting module 150 and the light-field data processor 255 are disposed in or integrated into the light-field camera 200. In other embodiments of the invention the light-field data formatting module 250 and/or the light-field data processor 255 may be provided in a separate component external to the light-field capture camera. The separate component may be local or remote with respect to the light-field image capture device. It will be appreciated that any suitable wired or wireless protocol may be used for transmitting light-field image data to the formatting module 250 or light-field data processor 255; for example the light-field data processor may transfer captured light-field image data and/or other data via the Internet, a cellular data network, a WiFi network, a Bluetooth® communication protocol, and/or any other suitable means.

The light-field data formatting module 250 is configured to generate data representative of the acquired light-field, in accordance with embodiments of the invention.

The light-field data formatting module 250 may be implemented in software, hardware or a combination thereof.

The light-field data processor 255 is configured to operate on raw light-field image data received directly from the LF data acquisition module 240 for example to generate focal stacks or a matrix of views in accordance with embodiments of the invention. Output data, such as, for example, still images, 2D video streams, and the like of the captured scene may be generated. The light-field data processor may be implemented in software, hardware or a combination thereof.

In at least one embodiment, the light-field camera 200 may also include a user interface 260 for enabling a user to provide user input to control operation of camera 100 by controller 270. Control of the camera may include one or more of control of optical parameters of the camera such as shutter speed, or in the case of an adjustable light-field camera, control of the relative distance between the microlens array and the photosensor, or the relative distance between the objective lens and the microlens array. In some embodiments the relative distances between optical elements of the light-field camera may be manually adjusted. Control of the camera may also include control of other light-field data acquisition parameters, light-field data formatting parameters or light-field processing parameters of the camera. The user interface 260 may comprise any suitable user input device(s) such as a touchscreen, buttons, keyboard, pointing device, and/or the like. In this way, input received by the user interface can be used to control and/or configure the LF data formatting module 250 for controlling the data formatting, the LF data processor 255 for controlling the processing of the acquired light-field data and controller 270 for controlling the light-field camera 200.

The light-field camera includes a power source 280, such as one or more replaceable or rechargeable batteries. The light-field camera comprises memory 290 for storing captured light-field data and/or rendered final images or other data such as software for implementing methods of embodiments of the invention. The memory can include external and/or internal memory. In at least one embodiment, the memory can be provided at a separate device and/or location from camera 200. In one embodiment, the memory includes a removable/swappable storage device such as a memory stick.

The light-field camera may also include a display unit 265 (e.g., an LCD screen) for viewing scenes in front of the camera prior to capture and/or for viewing previously captured and/or rendered images. The screen 265 may also be used to display one or more menus or other information to the user. The light-field camera may further include one or more I/O interfaces 295, such as FireWire or Universal Serial Bus (USB) interfaces, or wired or wireless communication interfaces for data communication via the Internet, a cellular data network, a WiFi network, a Bluetooth® communication protocol, and/or any other suitable means. The I/O interface 295 may be used for transferring data, such as light-field representative data generated by LF data formatting module in accordance with embodiments of the invention and light-field data such as raw light-field data or data processed by LF data processor 255, to and from external devices such as computer systems or display units, for rendering applications.

Figure 2B:
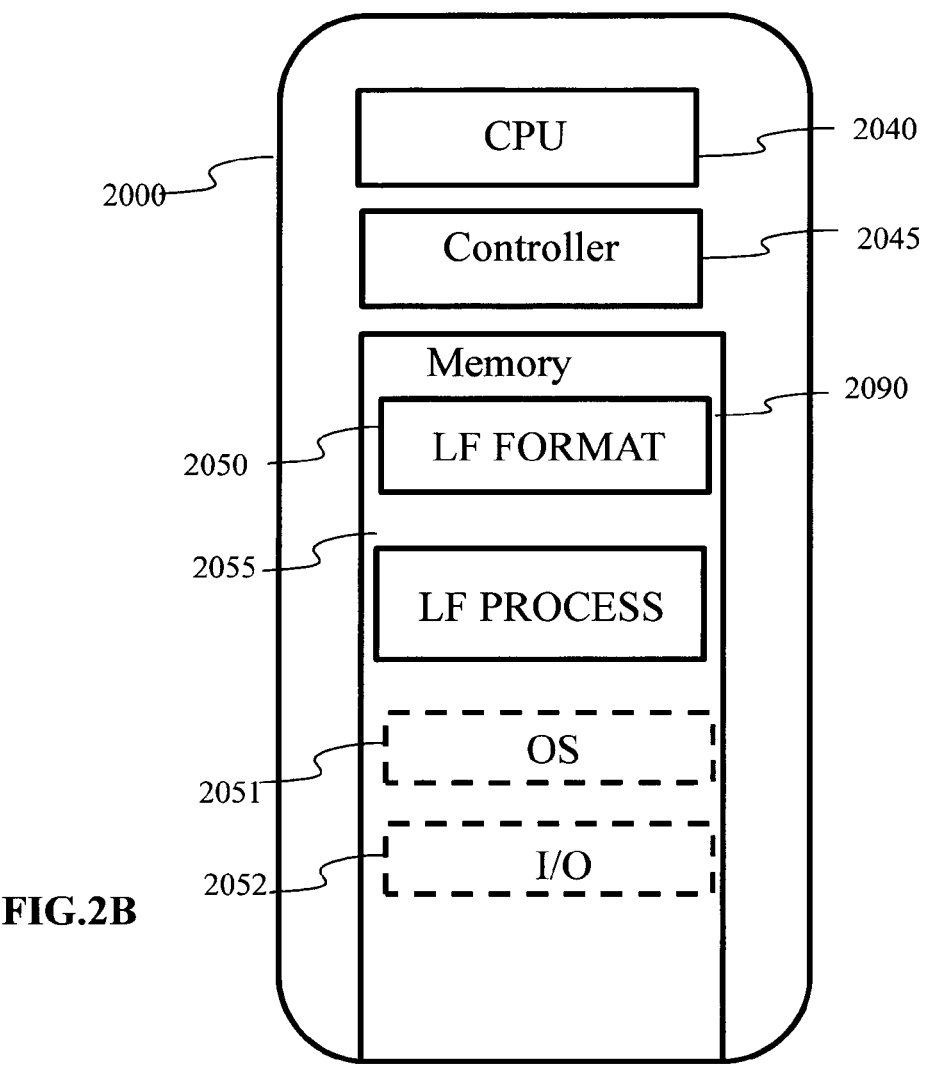
FIG. 2B is a functional diagram of a light-field data formator and light-field data processor according to an embodiment of the invention.

FIG. 2B is a block diagram illustrating a particular embodiment of a potential implementation of light-field data formatting module 250 and the light-field data processor 253.

The circuit 2000 includes memory 2090, a memory controller 2045 and processing circuitry 2040 comprising one or more processing units (CPU(s)). The one or more processing units 2040 are configured to run various software programs and/or sets of instructions stored in the memory 2090 to perform various functions including light-field data formatting and light-field data processing. Software components stored in the memory include a data formatting module (or set of instructions) 2050 for generating data representative of acquired light data in accordance with embodiments of the invention and a light-field data processing module (or set of instructions) 2055 for processing light-field data in accordance with embodiments of the invention. Other modules may be included in the memory for applications of the light-field camera device such as an operating system module 2051 for controlling general system tasks (e.g. power management, memory management) and for facilitating communication between the various hardware and software components of the device 2000, and an interface module 2052 for controlling and managing communication with other devices via I/O interface ports.

Figure 3:
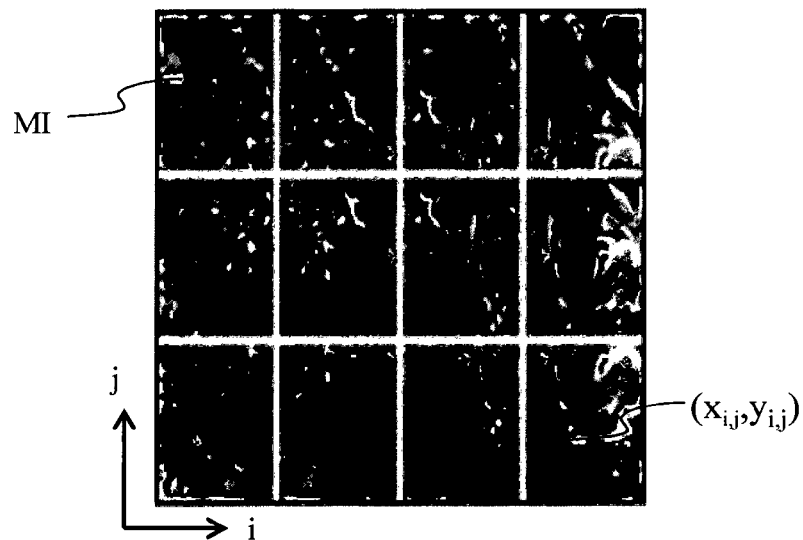
FIG. 3 is an example of a raw light-field image formed on a photosensor array.

FIG. 3 illustrates an example of a 2D image formed on the photosensor array 220 of FIG. 2A. The 2D image, often referred to as a raw image representing 4D light-field, is composed of an array of micro images M1, each micro image being produced by the respective micro lens (i,j) of the microlens array 210. The micro images are arranged in the array in a rectangular lattice structure defined by axes i and j. A micro lens image may be referenced by the respective micro lens coordinates (i,j). A pixel P1 of the photosensor 220 may be referenced by its spatial coordinates (x,y). 4D light-field data associated with a given pixel may be referenced as (x,y,i,j).

There are several ways of representing (or defining) a 4D light-field image. For example, a 4D light-field image can be represented, by a collection of micro-lens images as previously described with reference to FIG. 3. A 4D light-field image may also be represented, when recorded by a plenoptic camera by a set of sub-aperture images. Each sub-aperture image of composed of pixels of the same position selected from each microlens image. Furthermore, a 4D light-field image may be represented by a set of epipolar images, which is not the case of the pixel beam.

Embodiments of the invention provide a representation of light-field data based on the notion of pixel beam. In this way the diversity in formats and light-field devices may be taken into account. Indeed, one drawback of ray based formats, is that the parameterization planes, used to computes the parameters representing the rays, have to be sampled to reflect the pixel formats and sizes. Therefore, the sampling needs to be defined along other data in order to recover physical meaningful information.

Figure 4:
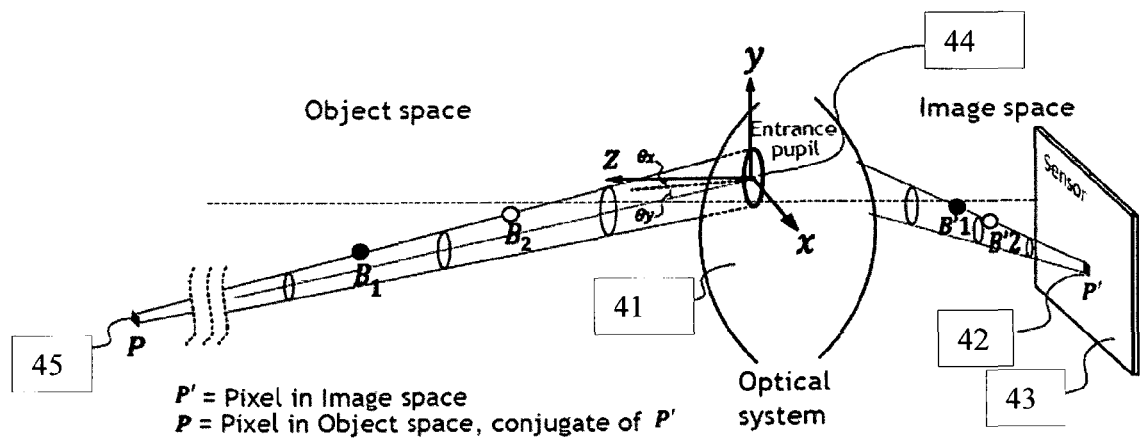
FIG. 4 represents a volume occupied by a set of rays of light in an object space of an optical system of a camera or optical acquisition system.

A pixel beam 40, as shown on FIG. 4, represents a volume occupied by a set of rays of light in an object space of an optical system 41 of a camera. The set of rays of light is sensed by a pixel 42 of a sensor 43 of the camera through a pupil 44 of said optical system 41. Contrary to rays, pixel beams 40 may be sample at will since they convey per se the "étendine" which corresponds to the preservation of the energy across sections of the physical light rays.

A pupil of an optical system is defined as the image of an aperture stop as seen through part of said optical system, i.e. the lenses of the camera which precedes said aperture stop. An aperture stop is an opening which limits the amount of light which passes through the optical system of the camera. For example, an adjustable diaphragm located inside a camera lens is the aperture stop for the lens. The amount of light admitted through the diaphragm is controlled by the diameter of the diaphragm opening which may adapted depending of the amount of light a user of the camera wishes to admit, or the depth of field the user wishes. For example, making the aperture smaller reduces the amount of light admitted through the diaphragm, but increases the depth of field. The apparent size of a stop may be larger or smaller than its physical size because of the refractive action of a lens. Formally, a pupil is the image of the aperture stop through the optical system of the camera.

A pixel beam 40 is defined as a pencil of rays of light that reaches a given pixel 42 when propagating through the optical system 41 via an entrance pupil 44. As light travels on straight lines in free space, the shape of such a pixel beam 40 can be defined by two sections, one being the conjugate 45 of the pixel 42, and the other being the entrance pupil 44. The pixel 42 is defined by its non-null surface and its sensitivity map.

Figure 5:
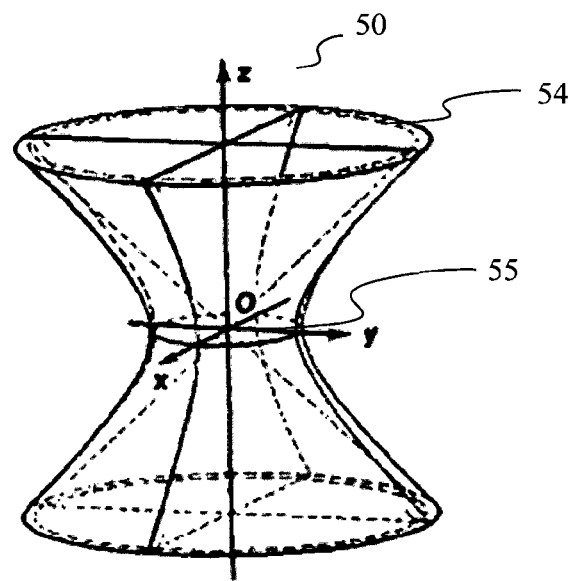
FIG. 5 represents a hyperboloid of one sheet.

Thus, a pixel beam may be represented by a hyperboloid of one sheet 50, as shown on FIG. 5, supported by two elements: the pupil 54 and the conjugate 55 of the pixel 42 in the object space of the camera.

A hyperboloid of one sheet is a ruled surface that can support the notion of pencil of rays of light and is compatible with the notion of "étendue" of physical light beams.

Since a hyperboloid of one sheet is a ruled surface, at least one family of straight lines, called generating rays, rotating around a revolution axis, called chief ray, of the hyperboloid, describe such a surface. The knowledge of parameters defining the chief ray and any generating ray belonging to a family of generating lines of the hyperboloid are sufficient to define a pixel beam 40, 50.

The general equation of a pixel beam 40, 50 is:

$$\frac{(x-x_0-z\cdot\tan\theta_x)^2}{a^2}+\frac{(y-y_0-z\cdot\tan\theta_y)^2}{b^2}-\frac{(z-z_0)^2}{c^2}=1 \quad (1)$$

where $(x_0,y_0,z_0)$ are the coordinates of a centre of the waist of the pixel beam in a (x,y,z) coordinates system, a, b, c are homologous to the length of semi-axes along Ox, Oy, Oz respectively, and $\theta_x$, $\theta_y$ define the chief ray directions relative to the entrance of the pupil 44 centre. They depend on the pixel 42 position on the sensor 43 and on the optical elements of the optical system 41. More precisely, the parameters $\theta_x$, $\theta_y$ represent shear angles defining a direction of the conjugate 45 of the pixel 42 from the centre of the pupil 44. However, such a representation of a pixel beam 40, 50 takes up large amounts of storage space since the classical file format for storing rays consists in storing a position and a direction in a 3D space. A solution for reducing the amount of storage space required to store a representation a pixel beam is described hereinafter in reference to FIG. 9B.

By nature, while chief rays will behave smoothly passing through the microlenses centres of the microlens array of the camera, generating rays suffer from stronger deviations on the borders of the microlenses. This disturbance of the generating rays makes it difficult to run the method described in reference to FIG. 9B since said method works with ordered collections of rays. To this end the inventors of the present invention propose a method for sorting the generating rays of a collection of pixel beams of a camera in order to feed the method according to FIG. 9B with such a sorted collection of generating rays.

Figure 6A:
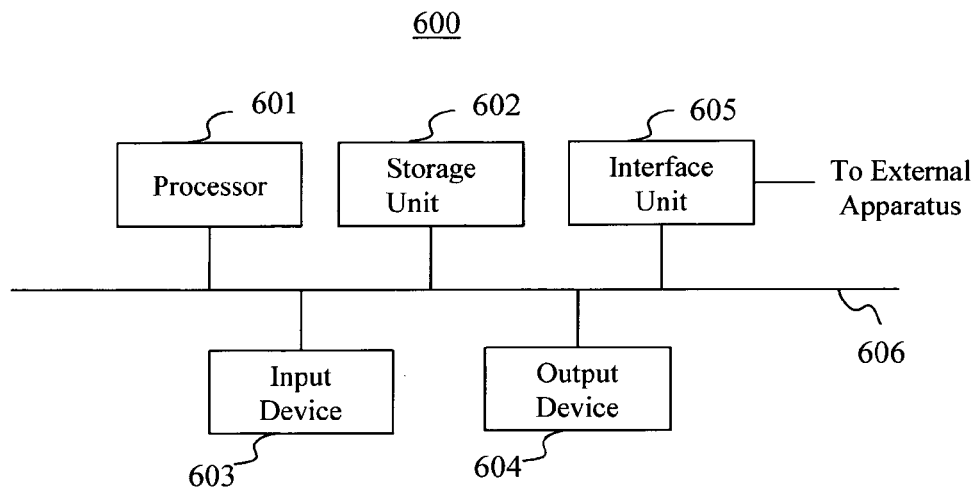
FIG. 6A is a functional block diagram illustrating modules of a device for sorting generating rays of a pixel beam in accordance with one or more embodiments of the invention.

FIG. 6A is a block diagram schematically illustrating the main modules of an apparatus for sorting the generating rays of a collection of pixel beams of a camera according to one or more embodiments of the invention.

The apparatus 600 comprises a processor 601, a storage unit 602, an input device 603, a display device 604, and an interface unit 605 which are connected by a bus 606. Of course, constituent elements of the computer apparatus 600 may be connected by a connection other than a bus connection.

The processor 601 controls operations of the apparatus 600. The storage unit 602 stores at least one program capable of sorting the generating rays of a collection of pixel beams of a camera to be executed by the processor 601, and various data, including parameters related to the optical system 210 of the optical acquisition system, parameters used by computations performed by the processor 601, intermediate data of computations performed by the processor 601, and so on. The processor 601 may be formed by any known and suitable hardware, or software, or a combination of hardware and software. For example, the processor 601 may be formed by dedicated hardware such as a processing circuit, or by a programmable processing unit such as a CPU (Central Processing Unit) that executes a program stored in a memory thereof.

The storage unit 602 may be formed by any suitable storage or means capable of storing the program, data, or the like in a computer-readable manner. Examples of the storage unit 602 include non-transitory computer-readable storage media such as semiconductor memory devices, and magnetic, optical, or magneto-optical recording media loaded into a read and write unit. The program causes the processor 601 to perform a process for computing parameters representing a volume occupied by a set of rays of light in an object space of an optical system and encoding these parameters with an image captured by the optical acquisition system according to an embodiment of the present disclosure as described hereinafter with reference to FIG. 9B.

The input device 603 may be formed by a keyboard, a pointing device such as a mouse, or the like for use by the user to input commands, to make user's selections of parameters used for generating a parametric representation of a volume occupied by a set of rays of light in an object space of an optical system. The output device 604 may be formed by a display device to display, for example, a Graphical User Interface (GUI), images generated according to an embodiment of the present disclosure. The input device 603 and the output device 604 may be formed integrally by a touch-screen panel, for example.

The interface unit 605 provides an interface between the apparatus 600 and an external apparatus. The interface unit 605 may be communicable with the external apparatus via cable or wireless communication. In an embodiment, the external apparatus may be a camera, or a portable device embedding such a camera like a mobile phone, a tablet, etc.

Figure 6B:
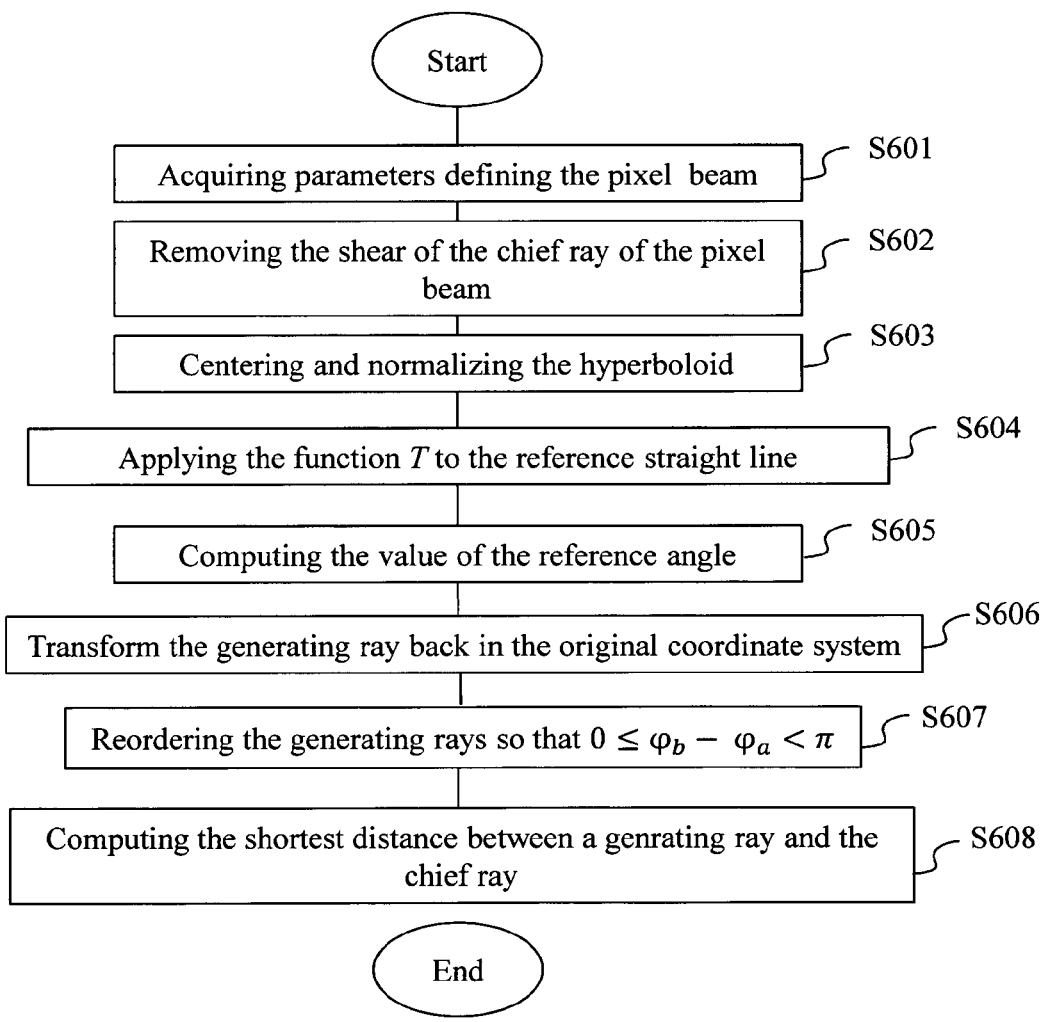
FIG. 6B is a flow chart illustrating steps of a method for sorting the generating rays of a pixel beam in accordance with one or more embodiments of the invention FIGS. 7A and 7B graphically illustrate the use of reference planes for parameterisation of light-field data in accordance with one or more embodiments of the invention.

FIG. 6B is a flow chart illustrating the steps of a method for sorting the generating rays of a collection of pixel beams of a camera according to one or more embodiments of the invention.

When all generating rays representing a collection of pixel beams cross a reference straight line Δ, this knowledge can be used to reduce the dimensionality of the data representing the pixel beams of the collection of pixel beams by one. The method for sorting the generating rays of a collection of pixel beams according to an embodiment of the invention relies on this property.

In the example of a two parallel planes parameterization of the plenoptic function, let's define the reference straight line Δ and a generating ray ρ of a hyperboloid representing a pixel beam to be represented by two coordinates in each plane:

$$\begin{cases} \Delta: (x_{\Delta 1}, y_{\Delta 1}, x_{\Delta 2}, y_{\Delta 2}) = (M_{\Delta 1}, M_{\Delta 2}) \\ \rho: (x_1, y_1, x_2, y_2) = (M_1, M_2) \end{cases}$$

As ρ and Δ cross each other, the four points $M_{\Delta 1}$, $M_{\Delta 2}$, $M_1$, $M_2$, defining respectively the reference straight line Δ in the first plane $x_1 O_1 y_1$ and the second plane $x_2 O_2 y_2$ and the generating ray ρ in the first plane $x_1 O_1 y_1$ and the second plane $x_2 O_2 y_2$, are located in a same plane intersecting the two parallel planes $x_1 O_1 y_1$ and $x_2 O_2 y_2$, so that a parameter k can be defined as $\overrightarrow{M_{\Delta 2} M_2} = k \cdot \overrightarrow{M_{\Delta 1} M_1}$. Then, knowing the coordinates of the reference straight line Δ $(x_{\Delta 1}, y_{\Delta 1}, x_{\Delta 2}, y_{\Delta 2})$, the triplet $(x_1, y_1, k)$ can define any generating ray ρ crossing Δ. The dimensionality is thus reduced from four to three.

Other parameterizations can be envisaged with the same dimensionality reduction.

For example, knowing the reference straight line $\Delta$, the triplet $(x_1,y_1,z_{I\Delta 1})$ can define the generating ray $(M_1, I_\Delta)$, where, $I_\Delta$ is the intersection point between the reference straight line $\Delta$ and the generating ray $\rho$, and $z_{I\Delta 1}$ the coordinate of $I_\Delta$ along Oz.

In a preliminary step S601, parameters $(x_0,y_0,z_0)$, a, b, c and $\theta_x$, $\theta_y$ defining the different pixel beams associated to the pixels of the sensor of the camera are acquired either by calibrating the camera of by retrieving such parameters from a data file stored in a remote server or on a local storage unit such as the memory 290 of the camera or a flash disk connected to the camera. This acquisition or calibration may be executed by the processor 601 of the apparatus 600.

The computation of the values of the parameters $(x_0,y_0,z_0)$, a, b, c and $\theta_x$, $\theta_y$ is realized, for example, by running a program capable of modelling a propagation of rays of light through the optical system of the camera. Such a program is for example an optical design program such as Zemax©, ASAP© or Code V©. An optical design program is used to design and analyze optical systems. An optical design program models the propagation of rays of light through the optical system; and can model the effect of optical elements such as simple lenses, aspheric lenses, gradient index lenses, mirrors, and diffractive optical elements, etc. The optical design program may be executed by the processor 601 of the apparatus 600.

In a step S602 executed by the processor 601, the shear of the chief ray of a pixel beam is removed. Unshearing the chief ray consists in writing:

$$\begin{cases} \bar{x} = x - z \cdot \tan\theta_x \\ \bar{y} = y - z \cdot \tan\theta_y \end{cases}$$

which gives a hyperboloid of one sheet which chief ray is parallel to the Oz axis:

$$\frac{(\bar{x}-x_0)^2}{a^2} + \frac{(\bar{y}-y_0)^2}{b^2} - \frac{(z-z_0)^2}{c^2} = 1 \quad (2)$$

where $(\tilde{x},\tilde{y},\tilde{z})$ are the coordinates of a point belonging to the surface of the hyperboloid, and $(x_0,y_0,z_0)$ are the coordinates of the centre of the waist of the considered pixel beam.

In a step S603, the processor 601 computes the centering of the hyperboloid on the point of coordinates $(x_0,y_0,z_0)$ and then compute the normalization of the hyperboloid which gives:

$$\begin{cases} X = \dfrac{(\bar{x}-x_0)}{a} \\ Y = \dfrac{(\bar{y}-y_0)}{b} \\ Z = \dfrac{(z-z_0)}{c} \end{cases} \quad (3)$$

Thus equation (1) now reads $$X^2+Y^2-Z^2=1 \quad (4)$$

Unshearing then centering and normalizing a pixel beam reverts to use the function:

$$T = \begin{cases} X = \dfrac{(x-z\cdot\tan\theta_x - x_0)}{a} \\ Y = \dfrac{(y-z\cdot\tan\theta_y - y_0)}{b} \\ Z = \dfrac{(z-z_0)}{c} \end{cases}$$

transforming (x,y,z) coordinates into (X,Y,Z) coordinates.

Since the central axis of the hyperboloid is the Oz axis, two points belonging to this axis have the following set of coordinates (0,0,0) and (0,0,1) in the (XYZ) coordinate system. This central axis of the hyperboloid, transformed back in the original coordinate system (x,y,z), is the chief ray $\rho_C$ of the pixel beam.

The hyperboloid defined by equation (4) has two families of generating rays:

a first family of generating rays is given by the rotation around the OZ axis of a straight line joining a first point of coordinates (1,0,0) and a second point of coordinates $(1,\zeta,\zeta)$ for any $\zeta \in \mathbb{R}$ *, for example $\zeta=1$, and a second family of generating rays is given by the rotation around the OZ axis of a straight line joining the point of coordinates (1,0,0) and a third point of coordinates $(1,-\zeta,\zeta)$ for any $\zeta \in \mathbb{R}$ *.

Any of these generating rays, transformed back in the original coordinate system, can be selected as $\rho_{G0}$ a generating ray of a pixel beam.

In the following description of the method according to an embodiment of the invention, two points $G_0$ which coordinates are (1,0,0) and $I_0$ which coordinates are (1,1,1) in the (XYZ) coordinate system as defining the initial generating ray $\rho_{G0}$ in the (XYZ) coordinate system.

In a step S604, the processor 601 applies the function T as defined above to a reference straight line $\Delta$ in the object space of the camera. In an embodiment of the invention, the reference straight line $\Delta$ is an optical axis of a main lens of the camera. In another embodiment of the invention, the reference straight line $\Delta$ is a central axis of a lens-array of the camera, in a third embodiment the reference straight line $\Delta$ is a line with a direction forming an angle inferior or equal to $$\frac{\pi}{4}$$

with the optical axis of the main lens of the camera.

The reference straight line $\Delta$ is defined by two points of coordinates $P_{\Delta 0}(x_{\Delta 0},y_{\Delta 0},z_{\Delta 0})$ and $P_{\Delta 1}(x_{\Delta 1},y_{\Delta 1},z_{\Delta 1})$ in the (x,y,z) coordinates system.

Applying the function T to the coordinates of $P_{\Delta 0}$ and $P_{\Delta 1}$ gives in the (XYZ) coordinate system:

$$\begin{cases} P_{\Delta 0} \;\; (X_{\Delta 0}, Y_{\Delta 0}, Z_{\Delta 0}) = T((x_{\Delta 0}, y_{\Delta 0}, z_{\Delta 0})) \\ P_{\Delta 1} \;\; (X_{\Delta 1}, Y_{\Delta 1}, Z_{\Delta 1}) = T((x_{\Delta 1}, y_{\Delta 1}, z_{\Delta 1})) \end{cases}$$

As the chief ray $\rho_C$ of the pixel beam is the Oz axis in the (XYZ) coordinate system, a rotation of angle $\varphi$ around the chief ray $\rho_C$ is given by the rotation matrix:

$$R_\varphi = \begin{bmatrix} \cos\varphi & -\sin\varphi & 0 \\ \sin\varphi & \cos\varphi & 0 \\ 0 & 0 & 1 \end{bmatrix}.$$

Naming $\rho_{G\varphi}(G_\varphi, I_\varphi)$ the image of the generating ray $\rho_{G0}(G_0, I_0)$ by the rotation of angle $\varphi$ around the chief ray $\rho_C$ the coordinates of the points $G_\varphi$ and $I_\varphi$ are given by:

$$G_\varphi = R_\varphi G_0 = \begin{bmatrix} \cos\varphi & -\sin\varphi & 0 \\ \sin\varphi & \cos\varphi & 0 \\ 0 & 0 & 1 \end{bmatrix} \begin{bmatrix} 1 \\ 0 \\ 0 \end{bmatrix} = \begin{bmatrix} \cos\varphi \\ \sin\varphi \\ 0 \end{bmatrix}$$

$$I_\varphi = R_\varphi I_0 = \begin{bmatrix} \cos\varphi & -\sin\varphi & 0 \\ \sin\varphi & \cos\varphi & 0 \\ 0 & 0 & 1 \end{bmatrix} \begin{bmatrix} 1 \\ 1 \\ 1 \end{bmatrix} = \begin{bmatrix} \cos\varphi - \sin\varphi \\ \sin\varphi + \cos\varphi \\ 1 \end{bmatrix}$$

During a step S605, the processor 601 computes the value of two distinct rotation angles $\varphi_a$ and $\varphi_b$ enabling the computation of two image rays $\rho_{G\varphi_a}$ and $\rho G\varphi_b$ of the generating ray $\rho_{G0}$ called transformed generating rays. The two image rays of the generating ray $\rho_{G0}$, i.e. rays $\rho_{G\varphi_a}$ and $\rho_{G\varphi_b}$ are obtained by, respectively, the rotation of angle $\varphi_a$ and $\varphi_b$ around the chief ray $\rho_C$.

The value of a rotation angle $\varphi$ is obtained when a given generating ray $\rho_{G\varphi}$ crosses the reference straight line $\Delta$, i.e the distance between the reference straight line $\Delta$ and the generating ray $\rho_{G\varphi}$ is equal to 0.

The distance between two skew lines with equations $$\begin{cases} \vec{x} = \vec{x_1} + (\vec{x_2} - \vec{x_1}) \cdot s \\ \vec{y} = \vec{x_3} + (\vec{x_4} - \vec{x_3}) \cdot t \end{cases}$$

is given by (Gellert et al. 1989, p. 538).

$$D = \frac{|(\vec{x_3} - \vec{x_1}) \cdot [(\vec{x_2} - \vec{x_1}) \times (\vec{x_4} - \vec{x_3})]|}{|(\vec{x_2} - \vec{x_1}) \times (\vec{x_4} - \vec{x_3})|}$$

This can be written in the concise form:

$$D = \frac{|\vec{c} \cdot (\vec{a} \times \vec{b})|}{|\vec{a} \times \vec{b}|}$$

by defining $$\begin{cases} \vec{a} = \vec{x_2} - \vec{x_1} \\ \vec{b} = \vec{x_4} - \vec{x_3} \\ \vec{c} = \vec{x_3} - \vec{x_1} \end{cases}$$

In the current case, for $$\begin{cases} \vec{x} = \vec{x_1} + (\vec{x_2} - \vec{x_1}) \cdot s \\ \vec{x} = \vec{x_3} + (\vec{x_4} - \vec{x_3}) \cdot t \end{cases}$$

$x_1 = P_{\Delta 0}$ and $x_2 = P_{\Delta 1}$, and $x_3 = G_\varphi$ and $x_4 = I_\varphi$ A distance between two straight lines being equals to zero reverts to compute:

$$D = 0 \Leftrightarrow \vec{c} \cdot (\vec{a} \times \vec{b}) = 0 \Leftrightarrow \det(\vec{a}\ \vec{b}\ \vec{c}) = 0 \Leftrightarrow \begin{vmatrix} a_1 & a_2 & a_3 \\ b_1 & b_2 & b_3 \\ c_1 & c_2 & c_3 \end{vmatrix} = 0$$

In the case of the reference straight line $\Delta$ and the generating ray $\rho_{G\varphi}$:

$$\begin{cases} \vec{a} = \vec{x_2} - \vec{x_1} = \overrightarrow{P_{\Delta 0} P_{\Delta 1}} = [X_{\Delta 1} - X_{\Delta 0}\quad Y_{\Delta 1} - Y_{\Delta 0}\quad Z_{\Delta 1} - Z_{\Delta 0}]^T \\ \vec{b} = \vec{x_4} - \vec{x_3} = \overrightarrow{G_\varphi I_\varphi} = [-\sin\varphi\quad \cos\varphi\quad 1]^T \\ \vec{c} = \vec{x_3} - \vec{x_1} = \overrightarrow{P_{\Delta 0} G_\varphi} = [\cos\varphi - X_{\Delta 0}\quad \sin\varphi - Y_{\Delta 0}\quad -Z_{\Delta 0}]^T \end{cases}$$

$$D = 0 \Leftrightarrow \begin{vmatrix} X_{\Delta 1} - X_{\Delta 0} & Y_{\Delta 1} - Y_{\Delta 0} & Z_{\Delta 1} - Z_{\Delta 0} \\ -\sin\varphi & \cos\varphi & 1 \\ \cos\varphi - X_{\Delta 0} & \sin\varphi - Y_{\Delta 0} & -Z_{\Delta 0} \end{vmatrix} =$$

$$0 \Leftrightarrow \begin{vmatrix} dX_\Delta & dY_\Delta & dZ_\Delta \\ -\sin\varphi & \cos\varphi & 1 \\ \cos\varphi - X_{\Delta 0} & \sin\varphi - Y_{\Delta 0} & -Z_{\Delta 0} \end{vmatrix} = 0$$

$$\begin{vmatrix} a_1 & a_2 & a_3 \\ b_1 & b_2 & b_3 \\ c_1 & c_2 & c_3 \end{vmatrix} = a_1 b_2 c_3 - a_1 b_3 c_2 - a_2 b_1 c_3 + a_2 b_3 c_1 + a_3 b_1 c_2 - a_3 b_2 c_1$$

$$D = -Z_{\Delta 0} \cdot \cos\varphi \cdot dX_\Delta - (\sin\varphi - Y_{\Delta 0}) \cdot dX_\Delta - Z_{\Delta 0} \cdot \sin\varphi \cdot dY_\Delta +$$
$$(\cos\varphi - X_{\Delta 0}) \cdot dY_\Delta - (\sin\varphi - Y_{\Delta 0}) \cdot \sin\varphi \cdot dZ_\Delta -$$
$$(\cos\varphi - X_{\Delta 0}) \cdot \cos\varphi \cdot dZ_\Delta$$

$$D = \cos\varphi \cdot (dY_\Delta - Z_{\Delta 0} \cdot dX_\Delta + X_{\Delta 0} \cdot dZ_\Delta) -$$
$$\sin\varphi \cdot (dX_\Delta + Z_{\Delta 0} \cdot dY_\Delta + Y_{\Delta 0} \cdot dZ_\Delta) + Y_{\Delta 0} \cdot dX_\Delta -$$
$$X_{\Delta 0} \cdot dY_\Delta - \sin^2\varphi \cdot dZ_\Delta - \cos^2\varphi \cdot dZ_\Delta$$

$$D = \cos\varphi \cdot (-Z_{\Delta 0} \cdot dX_\Delta + dY_\Delta + X_{\Delta 0} \cdot dZ_\Delta) - \sin\varphi \cdot$$
$$(dX_\Delta + Z_{\Delta 0} \cdot dY_\Delta + Y_{\Delta 0} \cdot dZ_\Delta) + (Y_{\Delta 0} \cdot dX_\Delta - X_{\Delta 0} \cdot dY_\Delta - dZ_\Delta)$$

Writing $D = A \cdot \cos\varphi + B \cdot \sin\varphi - C$ with:

$$\begin{cases} A = (-Z_{\Delta 0} \cdot dX_\Delta + dY_\Delta + X_{\Delta 0} \cdot dZ_\Delta) \\ B = -(dX_\Delta + Z_{\Delta 0} \cdot dY_\Delta + Y_{\Delta 0} \cdot dZ_\Delta) \\ C = -(Y_{\Delta 0} \cdot dX_\Delta - X_{\Delta 0} \cdot dY_\Delta - dZ_\Delta) \end{cases}$$

Two solutions for $\varphi$ giving D=0 can be found by:

$$A + B \cdot \tan\varphi =$$
$$\frac{C}{\cos\varphi} \Leftrightarrow (A + B \cdot \tan\varphi)^2 = \frac{C^2}{\cos^2\varphi} \Leftrightarrow A^2 + 2 \cdot A \cdot B \cdot \tan\varphi + B^2 \cdot \tan^2\varphi =$$
$$C^2 (1 + \tan^2\varphi) \Leftrightarrow (B^2 - C^2) \cdot \tan^2\varphi + 2 \cdot A \cdot B \cdot \tan\varphi + (A^2 - C^2) = 0$$

Discriminant: $\Lambda = 4 \cdot A^2 \cdot B^2 - 4 \cdot (B^2 - C^2) \cdot (A^2 - C^2) = 4 \cdot (A^2 + B^2 - C^2) \cdot C^2$ This leads to two solutions:

$$\tan \varphi^{\pm} = \frac{-2 \cdot A \cdot B \pm \sqrt{\Lambda}}{2 \cdot (B^2 - C^2)} = \frac{-A \cdot B \pm |C| \cdot \sqrt{A^2 + B^2 - C^2}}{B^2 - C^2} \quad 5$$

Thus, two angles $\varphi^{+}$ and $\varphi^{-}$ are identified for a given generating ray $\rho_{G\varphi}$ to cross the reference straight line $\Delta$.

Since there are two families of generating rays for a same hyperboloid, four different rays generating the pixel beam cross the reference straight line $\Delta$, two for each of the two families of generating rays. One generating ray is chosen among those four generating rays crossing the reference straight line. Then the selected generating ray is transformed back in the original coordinate system in a step S606.

Hence, in an embodiment of the invention the two rays $\rho_{G\varphi_a}$ and $\rho_{G\varphi_b}$ are selected among four different rays generating the pixel beam.

This method is run on the different pixel beams of the camera. Thus, two collections of rays are obtained: a first collection of rays comprising the first transformed generating rays $\rho_{G\varphi_a}$ of the pixel beams of the camera and a second collection of rays comprising the second transformed generating rays $\rho_{G\varphi_b}$.

In a step S607, the transformed generated rays $\rho_{G\varphi_a}$ and $\rho_{G\varphi_b}$ are reordered if needed in the collection of generating rays so that: $0 \leq \varphi_b - \varphi_a < \pi$.

In a step S608, the shortest distance d between one of the image rays $\rho_{G\varphi_a}$ or $\rho_{G\varphi_b}$ and the chief ray $\rho_C$ is computed. This shortest distance d corresponds to the waist the hyperboloid representing a pixel beam and is computed according to the method given by (Gellert et al. 1989, p. 538) as describe previously in reference to step S605 of the method according to an embodiment of the invention.

Figure 9A:
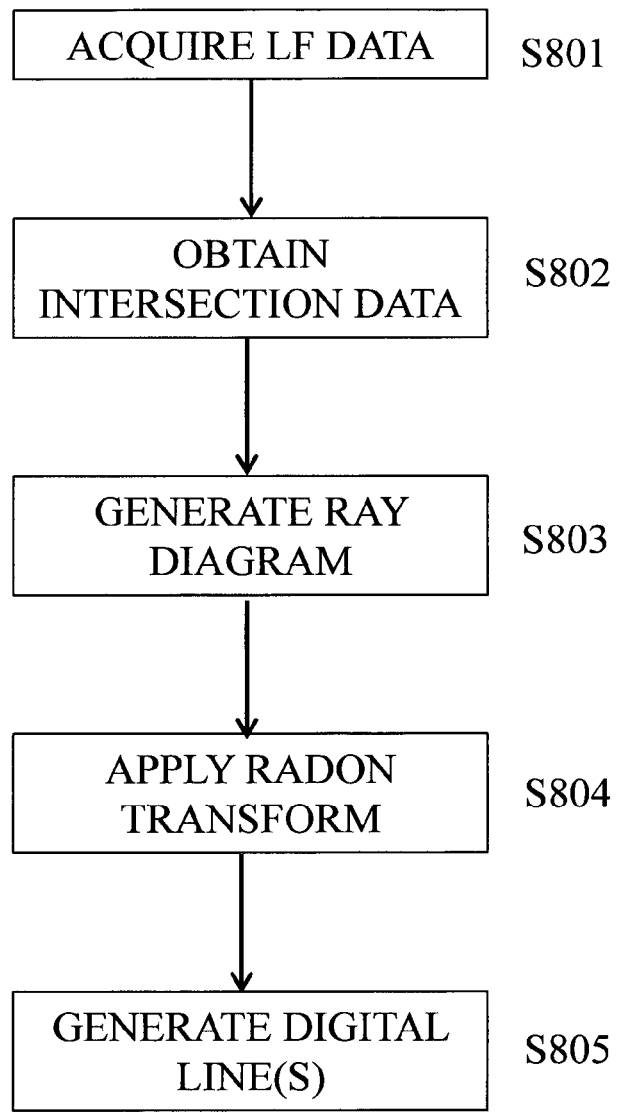
FIG. 9A is a flow chart illustrating steps of a method in accordance with one or more embodiments of the invention.
Figure 9B:
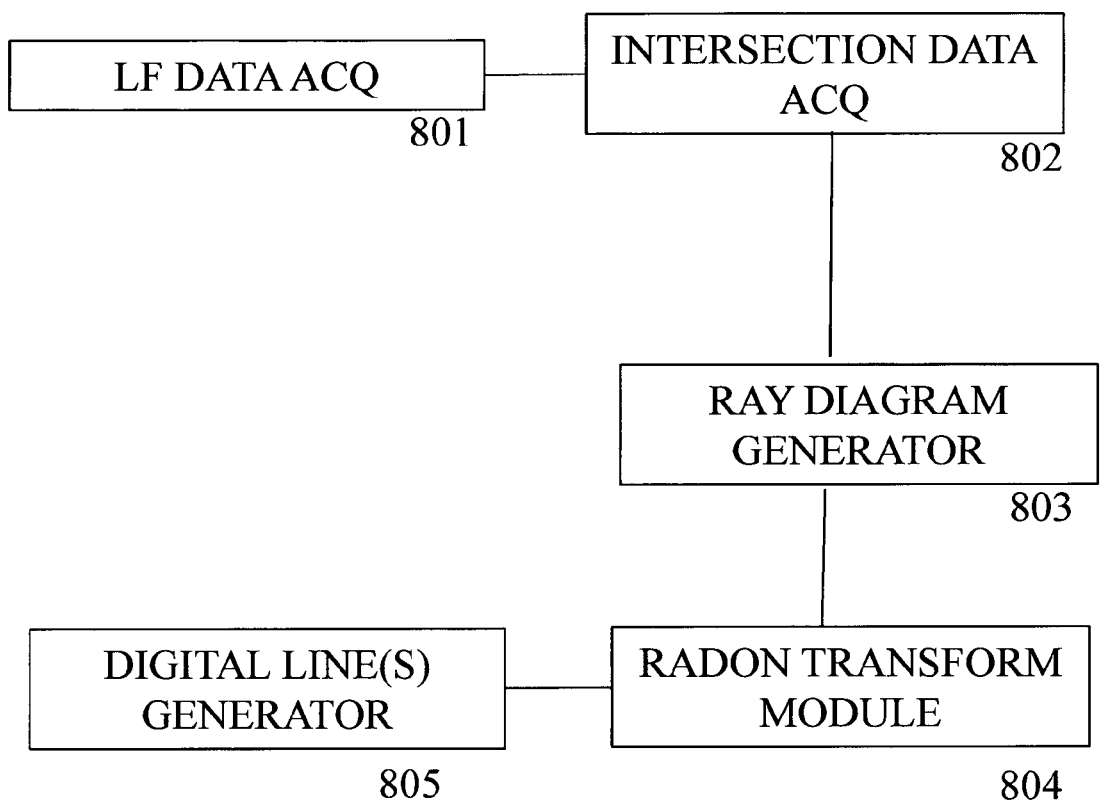
FIG. 9B is a functional block diagram illustrating modules of a device for providing a light data format in accordance with one or more embodiments of the invention.

The three parameters ($\rho_{G\varphi_a}$, $\rho_{G\varphi_b}$, d) representing a pixel beam, computed according to the steps S601 to S608 of the method according to the invention, are then used in the method describe hereafter in reference to FIG. 9B in order to provide a compact format for representing the pixel beams.

Knowing the triplet ($\rho_{G\varphi_a}$, $\rho_{G\varphi_b}$, d) it is possible to reconstruct a pixel beam. Since the image rays $\rho_{G\varphi_a}$ and $\rho_{G\varphi_b}$ belong to the same family of generating rays, these two lines never cross, and the two points at shorter distance are on the circle of smaller radius of the pixel beam, i.e. its waist.

Let's define $M_{Ga}$ and $M_{Gb}$ two points locates at a shorter distance from the other line and $\vec{v}_{ab} = \overrightarrow{M_{Ga} M_{Gb}}$ the vector in space joining these two points. It is known from literature that $\vec{v}_{ab} = k_{ab} \cdot (\vec{u}_a \times \vec{u}_b)$ where $k_{ab}$ is a constant $\vec{u}_a$ and $\vec{u}_b$ unit vectors of $P_{Ga}$ and $P_{Gb}$ and x the cross product.

Let's define as well $M_{ab}$ the middle point between $M_{Ga}$ and $M_{Gb}$. For symmetry reasons, as the chief ray $\rho_C$ is the rotation axis of the pixel beam generating rays family, 1) $\rho_C$ lies on the plane $\Pi$ through $M_{ab}$ perpendicular to $\vec{v}_{ab}$.

2) $\rho_C$ has its unit vector parallel to $$\vec{v}_{ab2} = \frac{\vec{u}_a + \vec{u}_b}{2}$$

Naming $M_C$ the center of the waist of the pixel beam the norm and orientation of vector $\vec{v}_{C\perp} = \overrightarrow{M_{ab} M_C}$ is computed.

Knowing $\vec{v}_{C\perp}$ lies in the plane $\Pi$ and is perpendicular to $\vec{v}_{ab2}$ for symmetry reasons it is possible to write $$\vec{v}_{C\perp} = k_{C\perp} \cdot (\vec{v}_{ab2} \times \vec{v}_{ab}) = k_{C\perp} \cdot \left( \frac{\vec{u}_a + \vec{u}_b}{2} \times (\vec{u}_a \times \vec{u}_b) \right)$$

where $k_{C\perp}$ is the constant to be determined depending on the waits radius d. $k_{C\perp}$ could be positive or negative, defining a waist circle on one side or the other side of the $\sqrt{M_{Ga} M_{Gb}}$ vector.

However, the condition that the image rays $\rho_{G\varphi_a}$ and $\rho_{G\varphi_b}$ are oriented towards +z (where z coordinate of unit vector is positive) and they are ordered so that $0 \leq \varphi_b - \varphi_b < \pi$ constraints the orientation of the cross product vectors, so $k_{C\perp}$ is defined as positive.

3) $k_{C\perp}$ value is adjusted so that $\|\overrightarrow{M_C M_{Ga}}\| = d$ (and simultaneously $\|\overrightarrow{M_C M_{Gb}}\| = d$, for symmetry reasons)

The conditions 1., 2. and 3. define the chief ray $\rho_C$ from the triplet ($\rho_{G\varphi_a}, \rho_{G\varphi_b}, d$) enabling the reconstruction of the pixel beam.

Figure 7A:
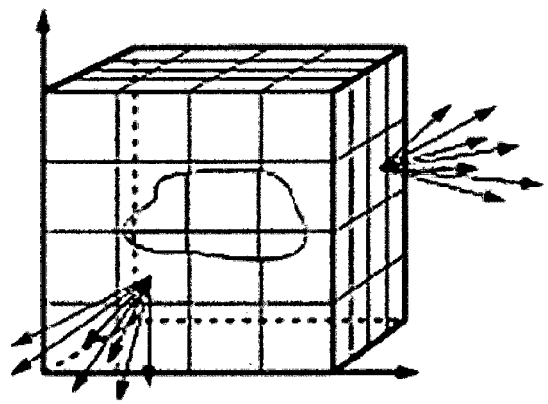

In order to propose a file format for storing rays which needs less storage space, a method for parametrizing the four dimensions of light-field radiance may be with reference to the cube illustrated in FIG. 7A. All six faces of the cube may be used to parameterize the light-field. In order to parameterize direction, a second set of planes parallel to the cube faces, may be added. In this way the light-field may be defined with respect to six pairs of planes with normals along the axis directions as:

$$\vec{i}, -\vec{i}, -\vec{j}, \vec{k}, -\vec{k}$$

Figure 7B:
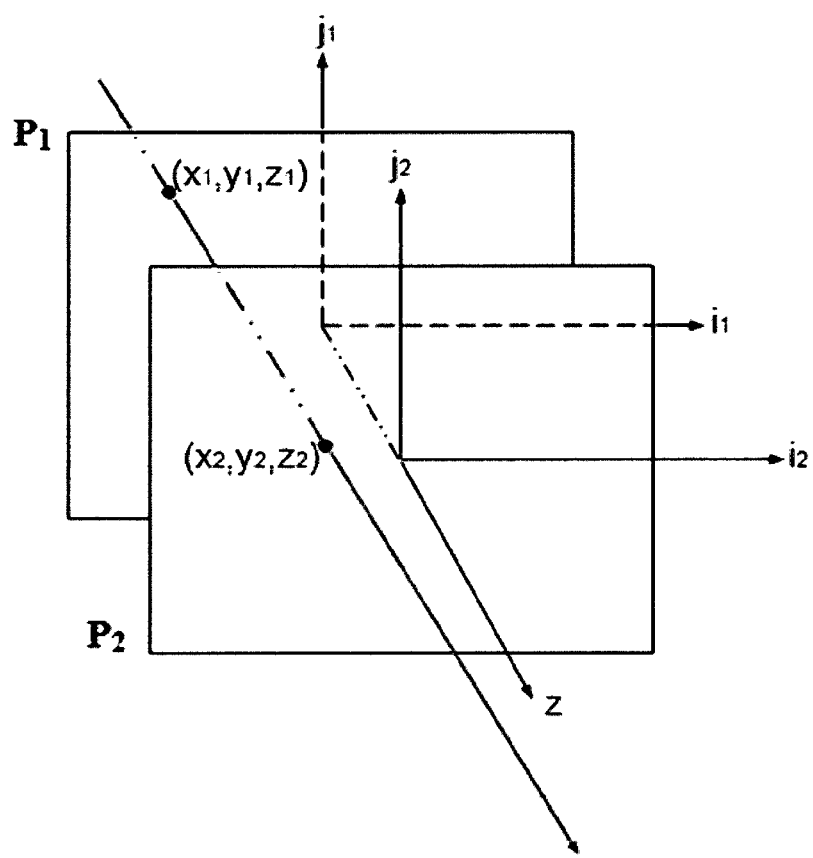

FIG. 7B illustrates a light-field ray, such as generating rays defining a pixel beam, passing through two reference planes P1 and P2 used for parameterization positioned parallel to one another and located at known depths $z_1$ and $z_2$ respectively. The light-field ray intersects the first reference plane $P_1$ at depth $z_1$ at intersection point $(x_1, y_1)$ and intersects the second reference plane $P_2$ at depth $z_2$ at intersection point $(x_2, y_2)$. In this way the light-field ray may be identified by four coordinates $(x_1, y_1, x_2, y_2)$. The light-field can thus be parameterized by a pair of reference planes for parameterization $P_1$, $P_2$ also referred herein as parametrization planes, with each light-field ray being represented as a point $(x_1, y_1, x_1, x_2) \in R^4$ in 4D ray space. Thus this is done for each generating ray of a collection of pixel beams of a camera.

For example an origin of the reference co-ordinate system may be placed at the center of a plane $P_i$ generated by the basis vectors of the coordinate axis system $(\vec{i}_1, \vec{j}_1)$ The $\vec{k}$ axis is normal to the generated plane $P_1$ and the second plane $P_2$ can be placed for the sake of simplicity at a distance $z = \Delta$ from plane $P_1$ along the $\vec{k}$ axis. In order to take into account the six different directions of propagation the entire light-field may be characterized by six pairs of such planes. A pair of planes, often referred to as a light slab characterizes the light-field interacting with the sensor or sensor array of the light-field camera along a direction of propagation.

The position of a reference plane for parameterization can be given as:

$\vec{x}_0 = d\vec{n}$ where $\vec{n}$ is the normal and d is an offset from the origin of the 3D coordinate system along the direction of the normal.

A Cartesian equation of a reference plane for parameterization can be given as:

$$\vec{n} \cdot (\vec{x} - \vec{x_0}) = 0$$

If a light-field ray has a known position:

$\vec{x_i}(x_i, y_i, z_i)$ and a normalized propagation vector.

$\vec{u}(u_1, u_2, u_3)$ the general parametric equation of a ray in 31) may be given as:

$$\vec{x} = t\vec{u} + \vec{x_i}$$

The co-ordinates of the intersection $\vec{x1}$ between the light-field ray and a reference plane are given as:

$$\vec{x_1} = \vec{x_i} + \vec{u} \frac{\vec{n}(\vec{x_0} - \vec{x_i})}{\vec{u}\vec{n}} \quad (A)$$

There is no intersection between the light-field rays and the reference parameterization if the following condition is not satisfied:

$$(\vec{x_1} - \vec{x_0}) \vec{u} > 0$$

Due to the perpendicularity with one of the axes of the system of the pair of reference planes used to parameterize the light-field, one of the components of the ray intersection is always constant for each plane. Hence if there is an intersection of a light-field ray $\vec{x1}$ with the first reference plane, and the intersection $\vec{x2}$ of the said light-field with the second reference plane, four coordinates vary and equation A can be used to calculate the four parameters of a light-field ray. These four parameters can be used to build up a 4D ray diagram of the light-field.

Figure 8:
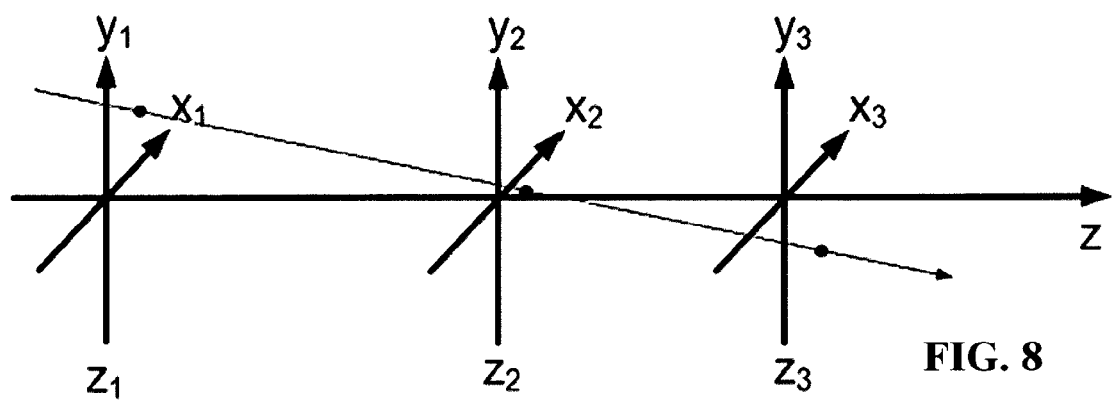
FIG. 8 schematically illustrates representation of light-field rays with respect to reference planes in accordance with embodiments of the invention.

Assuming parameterization of the light-field with reference to two parameterization reference planes, data representing the light-field may be obtained as follows. If a reference system is set as pictured in FIG. 8 a first parametrization plane P1 is perpendicular to z axis at z=z1, a second parametrization plane P2 is arranged perpendicular to the z axis at z=z2 and a ray whose light-field parameters are L(x1; y1; x2; y2) are to be rendered at a location z=z3 where a photosensor array of a light-field camera is positioned. From equation (A):

$$\vec{x_3} = \vec{x_2} + \vec{u}\frac{\vec{n}(z_3\vec{n} - \vec{x_2})}{\vec{u}\vec{n}}$$

$$\vec{x_3} = \vec{x_1} + \vec{u}\frac{\vec{n}(z_3\vec{n} - \vec{x_1})}{\vec{u}\vec{n}} \text{ with}$$

$$\vec{u} = \frac{\vec{x_2} - \vec{x_1}}{\|\vec{x_2} - \vec{x_1}\|} = \frac{(u_x, u_y, u_z)}{\vec{n}(0, 0, 1)}$$

Developing the above expression gives:

$$x_3 = x_2 + \frac{u_x}{u_z}(z_3 - z_2)$$

$$y_3 = y_2 + \frac{u_y}{u_z}(z_3 - z_2)$$

$$z_3 = z_3$$

$$x_3 = x_1 + \frac{u_x}{u_z}(z_3 - z_1)$$

$$y_3 = y_1 + \frac{u_y}{u_z}(z_3 - z_1)$$

$$z_3 = z_3$$

Both sets of equation should deliver the same point $\vec{x3}$ as the rendered light-field ray at the new location. By replacing $u_x$; $u_y$; $u_z$ with their corresponding expression as functions of $\vec{x1}$ and $\vec{x2}$, if the second set of equation from the previous block is used and $\vec{x3}$ and $\vec{y3}$ are added together:

$$x_1 + \frac{z_3 - z_1}{z_2 - z_1}(x_2 - x_1) + y_1 + \frac{z_3 - z_1}{z_2 - z_1}(y_2 - y_1) = x_3 + y_3$$

Leading to the expression:

$$(z_2 - z_3)(x_1 + y_1) + (z_3 - z_1)(x_2 + y_2) = (z_2 - z_1)(x_3 + y_3) \quad (B)$$

Co-ordinates with a subscript $_3$ relate to a known point $(x_3, y_3, z_3)$ where the light-field is rendered. All depth co-ordinates $z_3$ are known. The parameterization planes are in the direction of propagation or rendering. The light-field data parameters L are $(x_1, y_1, x_2, y_2)$ The light-field rays that form an image at point $(x_3, y_3, z_3)$ are linked by expression (B) which defines a hyper plane in $\mathbb{R}^4$.

This signifies that if images are to be rendered from a two-plane parameterized light-field, only the rays in the vicinity of hyperplanes need to be rendered, there is no need to trace them. FIG. 9A is a flow chart illustrating the steps of a method for generating data representative of a light-field according to one or more embodiments of the invention. FIG. 9B is a block diagram schematically illustrating the main modules of a system for generating data representative of a light-field according to one or more embodiments of the invention.

In a preliminary step S801 of the method parameters defining the the generating rays and the shortest distance d between one of the generating rays and the chief ray $\rho_C$ of the different pixel beams associated to the pixels of the sensor of the camera are acquired. These parameters are obtained as a result of the method for sorting the generating rays described above.

Such parameters are the coordinates of two generating rays crossing the reference straight line of the different pixel In another preliminary step S802 raw light-field data is acquired by a light-field camera 801. The raw light-field data may for example be in the form of micro images as described with reference to FIG. 3. The light-field camera may be a light-field camera device such as shown in FIG. 1A or B and 2A and 2B.

Figure 10:
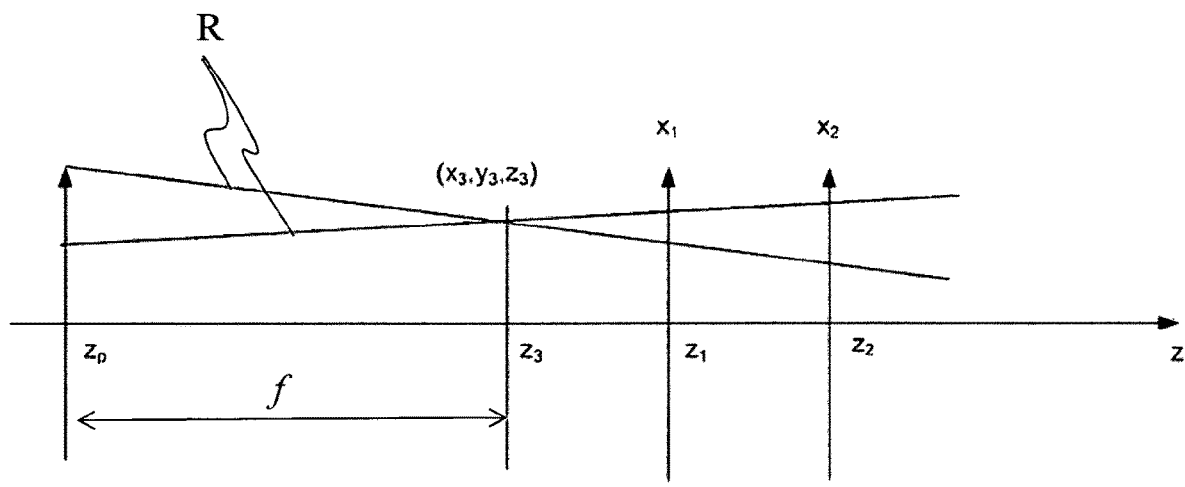
FIG. 10 schematically illustrates parameters for representation of light-field rays in accordance with embodiments of the invention.

In step S803 the acquired light-field data is processed by ray parameter module 802 to provide intersection data $(x_1, y_1, x_2, y_2)$ defining intersection of captured light-field rays, which correspond to the generating rays crossing the reference straight line of pixel beams 40, 50, with a pair of reference planes for parameterization $P_1$, $P_2$ at respective depths $z_1$, $z_2$, From calibration of the camera the following parameters can be determined: the centre of projection $(x_3, y_3, z_3)$ the orientation of the optical axis of the camera and the distance f from the pinhole of the camera to the plane of the photosensor. The light-field camera parameters are illustrated in FIG. 10. The photosensor plane is located at depth $z_p$. The pixel output of the photosensor is converted into geometrical representation of light-field rays. A light-slab comprising the two reference planes $P_1$ and $P_2$ is located at depths $z_1$ and $z_2$, respectively, beyond $z_3$, at the other side of the centre of projection of the camera to the photosensor. By applying a triangle principle to the light rays, pixel coordinates $(x_p, y_p, z_p)$ recording the light projected from the array of microlenses can be mapped to ray parameters i.e. reference plane intersection points $(x_1, y_1, x_2, y_2)$ by applying the following expression:

$$x_1 = \frac{z_3 - z_1}{z_3 - z_p} x_p + \frac{z_1 - z_p}{z_3 - z_p} x_3$$

$$y_1 = \frac{z_3 - z_1}{z_3 - z_p} y_p + \frac{z_1 - z_p}{z_3 - z_p} y_3$$

$$x_2 = \frac{z_3 - z_2}{z_3 - z_p} x_p + \frac{z_1 - z_p}{z_3 - z_p} x_3$$

$$y_2 = \frac{z_3 - z_2}{z_3 - z_p} y_p + \frac{z_1 - z_p}{z_3 - z_p} y_3$$

The above calculation may be extended to multiple cameras with different pairs of triplets $(x_p, y_p, z_p)$ $(x_3, y_3, z_3)$:

In the case of a plenoptic camera, a camera model with an aperture is used and a light-field ray is described in the phase space as having an origin $(x_p, y_p, z_p)$ and a direction $(x'_3, y'_3, 1)$. Its propagation unto the plane $(x_3, y_3)$ at depth $z_3$ can be described as a matrix transform. The lens will act as an ABCD matrix to refract the ray and another ABCD) propagation matrix will bring the ray onto the light-slab reference planes $P_1$ and $P_2$.

From this step intersection data $(x_1, y_1, x_2, y_2)$ geometrically defining intersection of the generating ray crossing the reference straight line with reference planes $P_1$, $P_2$ is obtained.

In step S804 2D ray a diagram graphically representing the intersection data $(x_1, y_1, x_2, y_2)$ is obtained by ray diagram generator module 803.

Figure 11:
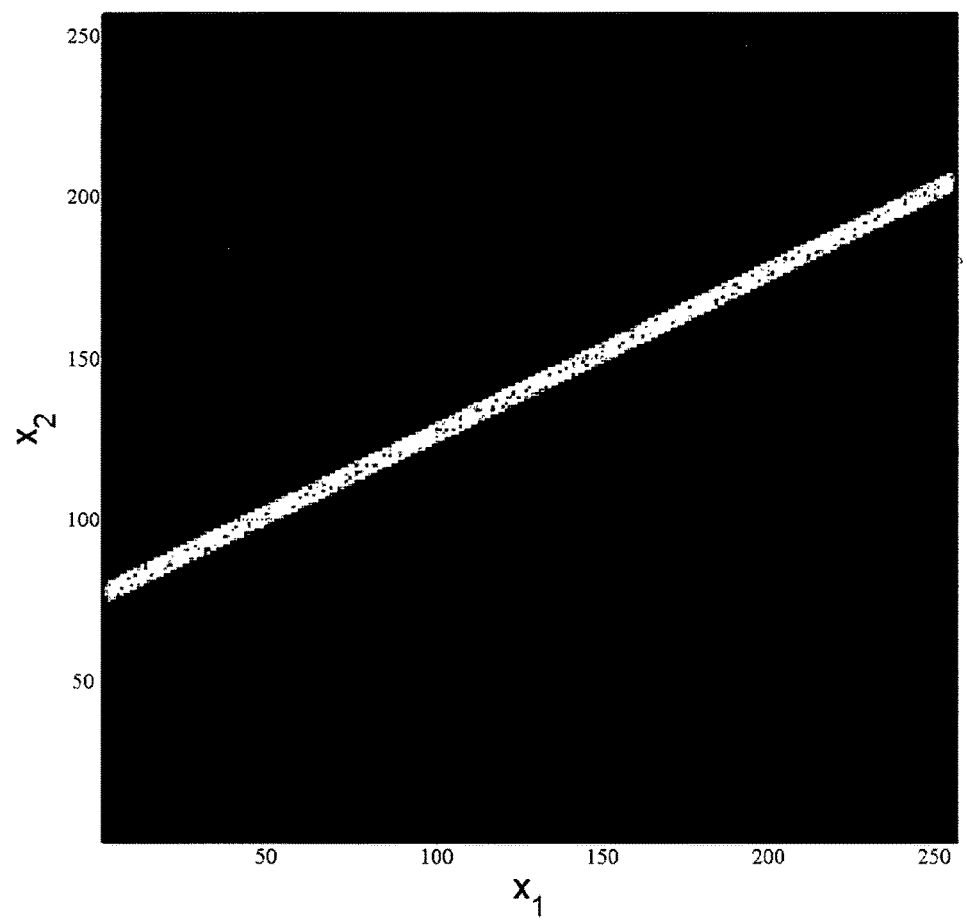
FIG. 11 is a 2D ray diagram graphically illustrating intersection data in accordance with embodiments of the invention.

FIG. 11 is a 2D ray diagram graphically representing intersection data $(x_1, x_2)$ of light-field rays captured by a camera at location $x_3=2$ and depth $z_3=2$ with an aperture $|A| < 0.5$. The data lines of the ray diagram used to parameterise are sampled by 256 cells providing an image of 256×256 pixels.

If the ray diagram illustrated in FIG. 11 is interpreted as a matrix, it can be seen that it is sparsely populated. If the rays were to be saved individually in a file instead of the 4D phase space matrix, this would require saving for each ray, at least 2 bytes (int16) for each position $x_i$ or $x_3$ plus 3 bytes for the color, i.e. 7 bytes per ray for a 2D slice light-field, and 11 bytes per ray for its full 4D representation. Even then, the rays would be stored randomly in the file which might be unsuitable for applications that need to manipulate the representation. The inventors of the present invention have determined how to extract only the representative data from the ray diagram matrix and to store the data in a file in a structured manner.

Since the light-field rays are mapped along data lines of the 2D ray diagram, it is more efficient to store parameters defining the data line rather than the line values themselves. Parameters defining the data line such as, for example, a slope defining parameter s and an axis intercept d may be stored with the set of light-field rays belonging to that data line.

This could require for example as little as 2 bytes for slope parameter s, 2 bytes for intercept parameter d and then only 3 bytes per ray. Moreover, the rays may be ordered along lines in the file. In order to set lines through matrix cells so called digital lines are generated which approximate the ray lines with minimum error.

To locate the data lines and to obtain slope parameter s and intercept parameter d step S805 a Radon transform is performed by line detection module 804 on the ray diagram generated in step S804.

From the obtained slope parameter s and intercept parameter d a representative digital line is generated by digital line generation module 805 in step S806. In this step digital lines are generated by approximating an analytical line to its nearest grid point, for example by applying Bresenham's algorithm. Indeed Bresenham's algorithm provides a way to provide a digital line with minimal operation. Other methods may apply a fast discrete Radon transform calculation. An example of Bresenham application is one adapted from the following reference:

http://www.cs.helsinki.fi/group/goa/mallinnus/lines/bresenh.html.

The digital format defines the data line by two points of a grid $(0,d)$ and $(N-1, s)$ d being the intersection corresponding to the value of $x_2$ when $x_1=0$ and s being the slope parameter corresponding to the value of $x_2$ when $x_1=N-1$. From the digital format generated the slope a of each individual line may be expressed as a function of d, N and s, as:

$$a = \frac{s-d}{N-1}$$

where:

$s \in \{0, 1, \ldots N-1\}$ and $d \in \{0, 1, \ldots N-1\}$

Figure 12:
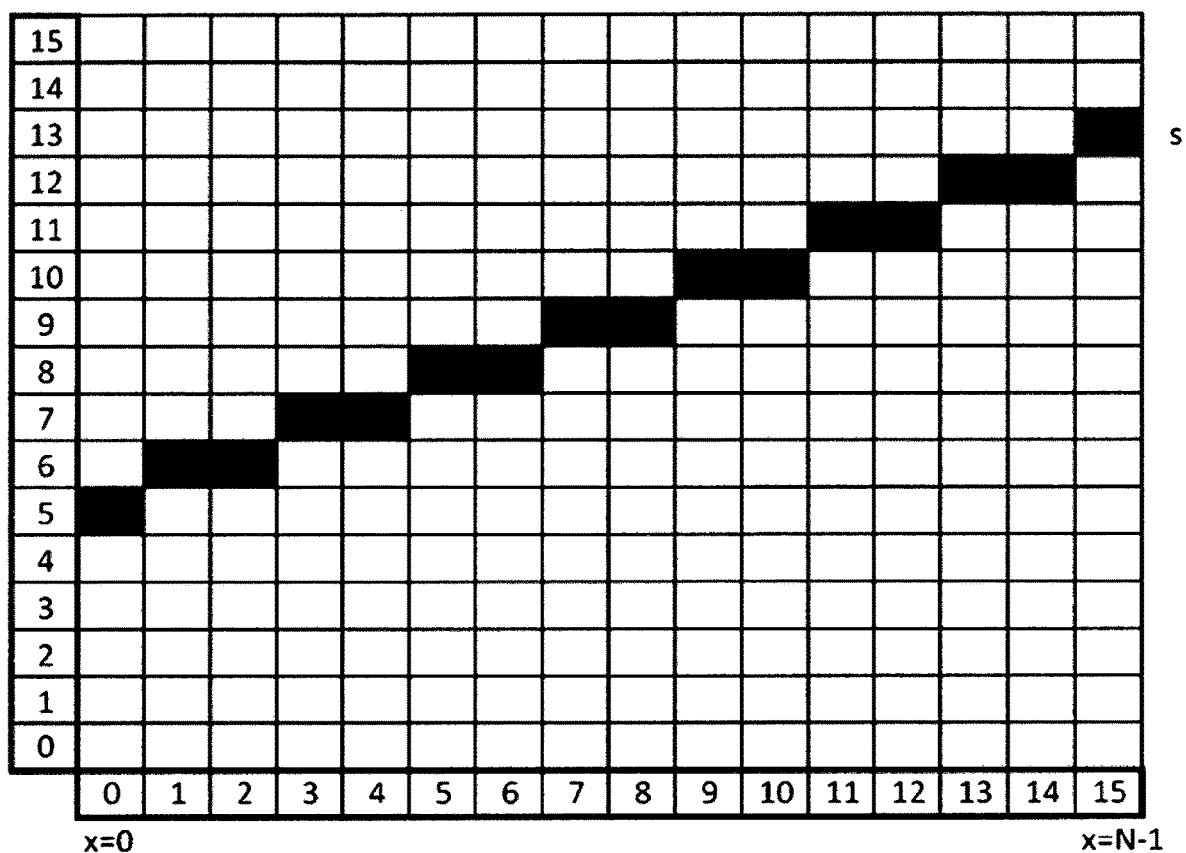
FIG. 12 graphically illustrates a digital line generated in accordance with embodiments of the invention.

FIG. 12 illustrates an example of a digital line generated by application of Bresenham's algorithm.

Figure 13:
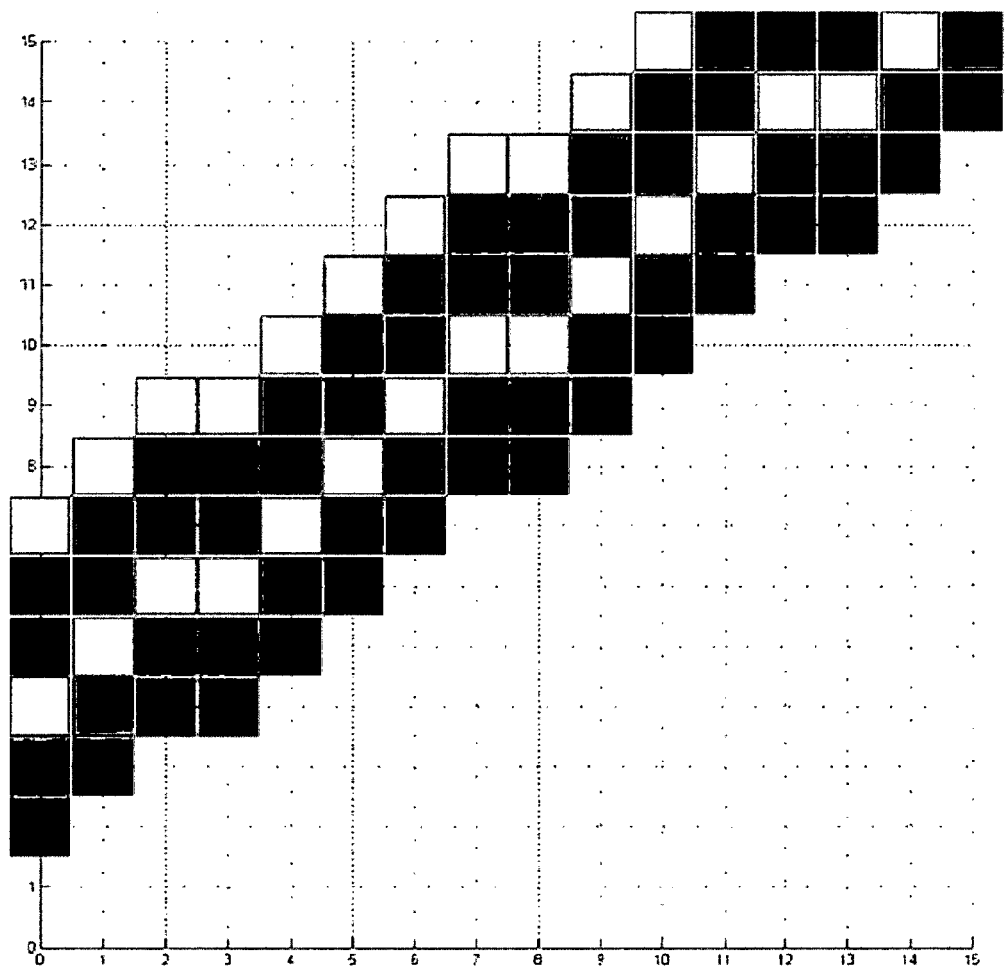
FIG. 13 graphically illustrates digitals line generated in accordance with embodiments of the invention.

FIG. 13 illustrates a group of digital lines having the same slope a (or s–d) but different intercepts d, the group of data lines being contiguous. The group of data lines is referred to herein as a bundle of lines and corresponds to a beam resulting from the camera not being ideally a pinhole camera. Each line addresses different pixels. In other words, one pixel belongs only to a unique line of a bundle with the same slope but different intercepts. The upper and lower boundaries of the axis intersections d are given as $d_{max}$ and $d_{min}$ respectively.

Ray data parameterized by a sampled pair of lines (in 2D) and belonging to one camera, belong to a family of digital lines (beam) in the phase space used for representing the data. The header of the beam can simply contain the slope a and the thickness of the beam defined by the upper and lower boundaries of the axis intersections $d_{max}-d_{min}$. The ray values will be stored as RGB colors along digital lines whose header can be d and s. Void cells of the ray diagram in the sampled space do not need to be stored. Coordinates x1; x2 of the rays can be deduced from the parameters d, s and from the position of the cell along the digital line.

Parameters to be estimated from the light-field or from camera's geometry are the slope a the lower and upper bounds of the digital line intercepts $(d_{min}, d_{max})$, and the digital line parameters $(d_i, s_i)$. The discrete Radon transform has already been discussed as a tool to measure the support location of the light-field in the ray diagram.

Figure 14A:
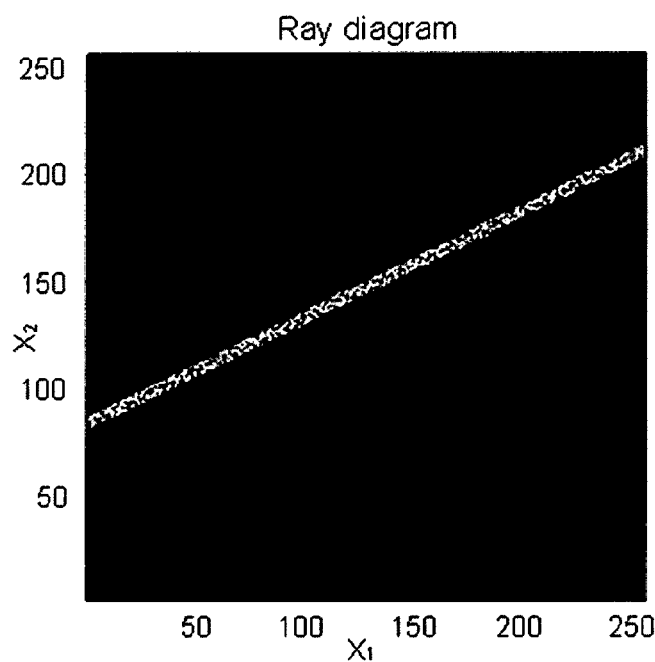
FIG. 14A-14C graphically illustrate Radon transforms applied to a digital line in accordance with embodiments of the invention.
Figure 14B:
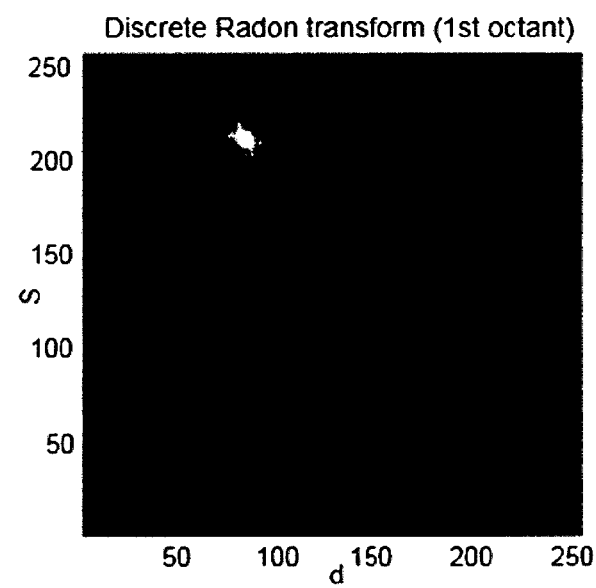
Figure 14C:
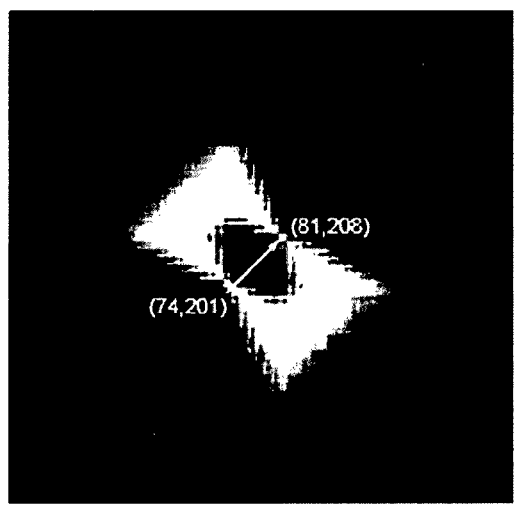
Figure 15:
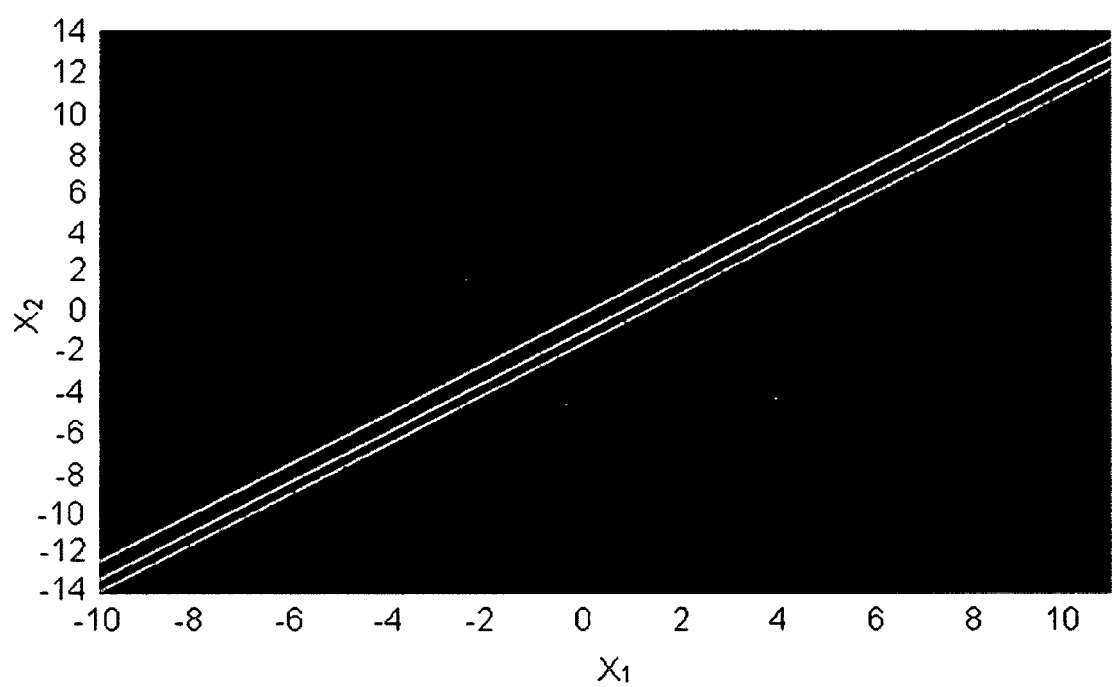
FIG. 15 is a 2D ray diagram graphically illustrating intersection data for a plurality of cameras in accordance with embodiments of the invention.

FIG. 14B shows the discrete Radon transform in the digital line parameter space (d,s) of the datalines of FIG. 14A. FIG. 14C is a zoom of the region of interest comprised in FIG. 14B. The beam of digital lines is located by the search for the maximum value parameters. There could be some offset between the geometrical center of symmetry of the DRT and the actual position of the maximum due to image content so that later on, an algorithm is used to pin-point the center of symmetry instead of the maximum. Then, the waist of the beam transform as shown on FIG. 13C is easy to find to give the values $(d_{min}, d_{max})$. Point $(d_{min}=74, s=201)$ is the lower envelope of the beam of digital lines from FIG. 12A, and point $(d_{max}=81, s=208)$ is the upper envelope of the beam of digital lines.

The equations of two orthogonal 2D sliced spaces from equation B is given as.

$$(z_2-z_3)(x_1+y_1)+(z_3-z_1)(x_2+y_2)=(z_2-z_1)(x_3+y_3) \quad (C)$$

If a 2D slice for $x_i$ coordinates is taken, the equation of the beam of lines where ray data through an aperture of size A at $(x_3, y\ z_3)$ will map is given as:

$$x_2 = \frac{(z_3-z_2)}{(z_3-z_1)}x_1 + \frac{(z_2-z_1)}{(z_3-z_1)}(x_3 \pm A) = mx_1 + (d_{max_x} - d_{min_x}) \quad (D)$$

Similarly, if a 2D slice is taken for $y_i$ coordinates:

$$y_2 = \frac{(z_3-z_2)}{(z_3-z_1)}y_1 + \frac{(z_2-z_1)}{(z_3-z_1)}(y_3 \pm A) = my_1 + (d_{max_y} - d_{min_y}) \quad (E)$$

As previously described, the values of m and $d_{max_x}$, $d_{min_x}$, $d_{max_y}$, $d_{min_y}$ may be evaluated in the discrete domain. To localize the characteristics of a light-field as defined by the format discussed previously, there is no need to perform a 4D discrete Radon transform (DRT). If two orthogonal 2D DRT are obtained, measurements can be performed of the slope m of the hyper-plane and the beam width of the digital hyper-planes where all data concentrates in the 4D ray-diagram.

This simpler procedure of location assumes a circular entrance pupil A so that $d_{max_x}$, $d_{min_x}$, $d_{max_y}$, $d_{min_y}$ will encompass all hyper-planes intercepts, some values written in the format will contain no values.

It would be interesting to obtain a format for the 4D case which is similar to what was proposed for the 2D case. To do so, it would be interesting to associate the 2D lines found on the $\Pi(x_1, x_2)$, plane with the lines found on the $\Pi(y_1, y_2)$ place, i.e., the lines that are the results of the intersection of the corresponding hyper plane with the two orthogonal slices of $\Pi(x_1, x_2)$, and $l(y_1, y_2)$, From expressions D and E, it is known that the corresponding lines have the same slope it. This is the first parameter that associates each line in $\Pi(x_1, x_2)$ to a line in $\Pi(y_1, y_2)$, for a camera at a certain depth. If there are multiple cameras at the same depth (i.e., the case of FIG. 14A), there are three lines in $\Pi(x_1, x_2)$, and three lines in $\Pi(y_1, y_2)$, with the same estimated slope of m. The correspondences in the line offsets between the lines in these two planes are then determined. To do this, the formulation of the lines in expressions D and E are exploited. In particular, denoting $$k = \frac{z_2-z_1}{z_3-z_1},$$

the offsets are as follows:

$$\begin{cases} kx_3 + kA = d_{max_x} \\ kx_3 - kA = d_{min_x} \end{cases} \text{ and } \quad (F)$$

$$\begin{cases} ky_3 + kA = d_{max_y} \\ ky_3 - kA = d_{min_y} \end{cases} \quad (G)$$

The sets of the equations may be solved for k, $x_3$ and $y_3$. Note that $(x_3, y_3, z_3)$ correspond to the coordinates of the camera, or in other words the voxel where the corresponding bundle of light is focused into a circle of the radius A. We have supposed that the aperture on the plane positioned at $z_3$ is circular, so that $d_{max_x} - d_{min_x} = d_{max_y} - d_{min_y} = 2 \, kA$, and by solving the previous sets of equations:

$$k = \frac{d_{max_x} - d_{min_x}}{2A} \quad (G)$$

$$x_3 = A\frac{d_{max_x} + d_{min_x}}{d_{max_x} - d_{min_x}} \quad (H)$$

$$y_3 = A\frac{d_{max_y} + d_{min_y}}{d_{max_y} - d_{min_y}} \quad (I)$$

$$z_3 = \frac{z_2 + (k-1)z_1}{k} \quad (J)$$

The digital lines may be scanned as before on $\Pi(x_1, x_2)$ using the Bresenham digital lines; For each individual $(x_1, x_2)$, value, the corresponding $(y_1, y_2)$ values captured in the light-field are stored. To find such values, expression C is exploited. All the following are either known or estimated from expressions F and G x3; y3; z3; z1; z2

Moving on each line in $\Pi(x_1, x_2)$, for each $(x_1^q, x_2^q)$, the following relationship in $(y_1, y_2)$ is obtained:

$$y_2 = \frac{z_3-z_2}{z_3-z_1}y_1 + \frac{z_3-z_2}{z_3-z_1}x_1^q + \frac{z_2-z_1}{z_3-z_1}(x_3+y_3) - x_2^q$$

or, $$y_2 = my_1 + mx_1^q + k(x_3+y_3^*) - x_2^q = my_1 + d_{off}(x_1^q, x_2^q, x_3, y_3)$$

For each point in $\Pi(x_1, x_2)$, a collection of lines in $\Pi(y_1, y_2)$ is saved. $d_{off}$ corresponds to the offset of the lines scanned and saved for $(x_1^q, x_2^q)$. It is noted that $$d_{off}(x_1^q, x_2^q) = mx_1^q + k(x_3+y_3) - x_2^q$$

With reference to FIG. 12 each square is a $(x_1^q, x_2^q)$, point, and for each one of these points, there is a set of Bresenham digital lines running out of the plane of the figure along a digital bundle defined by equation:

$$y_2 = my_1 + d_{off}(x_1^q, x_2^q, x_3, y_3^*) \quad (K)$$

perpendicular to the depicted datalines, but in a 4D space.

An exemplary data format for a bundle of data lines per camera is illustrated in Table 1.

TABLE 1

| Tags | | | Data | | | | |
|---|---|---|---|---|---|---|---|
| Light slab orientation 1 | | | one tag w from (−x, +x, −y, +y, −z, +z) | | | | |
| Parametrization plane offset $w_2-w_1$ ($w_3$ is relative to $w_1$) (float) | | | □ e | | | | |
| Width in number of $u_1$ cells (integer) | min $u_1$ value (float) | max $u_1$ value (float) | N | $u_{1min}$ | $u_{1Max}$ | | |
| Width in number of $u_2$ cells (integer) | min $u_2$ value (float) | max $u_2$ value (float) | M | $u_{2min}$ | $u_{2Max}$ | | |
| Width in number of $v_1$ cells (integer) | min $v_1$ value (float) | max $v_1$ value (float) | P | $v_{1min}$ | $v_{1Max}$ | | |
| Width in number of $v_2$ cells (integer) | min $v_2$ value (float) | max $v_2$ value (float) | Q | $v_{2min}$ | $v_{2Max}$ | | |
| Number of cameras (integer) | | | n | | | | |
| Aperture size for $cam_1$ | | | $A_1$ | | | | |
| $Cam_1$ focus (3 floats) | | | $u3_1$ | $v3_1$ | $w3_1$ | | |
| lowest $cam_1$ intercept in $(u_1, u_2)$ | $cam_1$ steepness | $cam_1$ number of digital lines in $u_1, u_2$ | $d_1$ | $m_1$ | $l_1^x$ | | |
| | | $cam_1$ number of digital lines in $v_1, v_2$ | | | $l_1^y$ | | |
| data line $(end_1 = l_1^x*N*l_1^y*P)$ * (3 bytes + 2floats) | | | $(RGB\ z_p\ a)_0$ | $(RGB\ z_p\ a)_1$ | ... | $(RGB\ z_p\ a)_n$ | |
| ... | | | ... | ... | | | |
| ... | | | ... | ... | ... | ... | |
| Aperture size for $cam_n$ | | | $A_n$ | | | | |
| $Cam_n$ focus (3 floats) | | | $u3_n$ | $v3_n$ | $w3_n$ | | |
| lowest $cam_n$ intercept in $(u_1, u_2)$ | $cam_n$ steepness | $cam_n$ number of digital lines in $u_1, u_2$ | $d_n$ | $m_n$ | $l_n^x$ | | |
| | | $cam_n$ number of digital lines in $v_1, v_2$ | | | $l_n^y$ | | |
| data line $(end_n = l_n^x*N*l_n^y*P)$ * (3 bytes + 3 floats) | | | $(RGB\ z_p\ a)_0$ | $(RGB\ z_p\ a)_1$ | ... | $(RGB\ z_p\ a)_n$ | |

Firstly, general metadata of the 4D space is provided: including boundaries of the 4 axes $x_1$, $x_2$, $y_1$, $y_2$ and their corresponding sampling. The number of cameras (bundles) is also provided. For each camera j the following parameters are saved:

the size of the aperture: A, which corresponds to the diameter of the pupil of a pixel beam, the focus point of the camera: $cam_j$, focusPoint=$(u_3,u_3,w_3)$ lowest d intercept in $(x1_x,2)=d_j$ steepness=$m_j$ number of digital lines in $(x_1,x_2)=l_j^x$ number of digital lines in $(y_1,y_2)=l_j^{xy}$ On each camera, for each $(x_1^q;x_2^q)$, scanning is started on $(y_1,y_2)$ with respect to expression (K) using the Bresenham digital lines, and the RGB values of each light-field rays are saved. In particular $y*_3-A$ to $y*_3+A$ and the corresponding $d_{off}$ is calculated according to expression (K).

The same calculations are performed in the decoding step using the stored metadata. In particular, k is found using equation (H). Hence the format remains compact. There is no need to store four indexes for each ray in the system. It is noted that the sampling of the hyper-plane above is the sampling of the 4D ray-space and thus a single x1; $y_1$; x2; $y_2$ location is not missed. This is only one example of a systematic scanning of the 4D ray-space for saving all data in a very compact form. Other processes may of course be applied. The parametric form seems to be adapted to explore the hyper-plane because it permits an inter-leaved space exploration.

In the case of multiple cameras to work on data that contains several bundles of hyper-planes (several maxima in the Radon transform due to multiple cameras), a more complex algorithm may be used. As a pre-processing step, the parameters (m,k) are found for all the peaks in the radon transform of $\Pi(x_1,x_2)$, and put in one set. The same is done for the peaks in $(y_1,y_2)$ and the parameters are put in another set. Now in each iteration of the greedy algorithm, the maximum peak intensity is found in the 2D radon transform of $(x_1,x_2)$ and the corresponding peak in $(y_1,y_2)$ is found by matching the previously found parameters (m,k). After saving the data as mentioned in the last section, these peaks are cleaned from the radon transforms, and the next iteration is started, until nothing meaningful remains in the light-field Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

The invention claimed is:

1. A computer implemented method for generating a set of data representative of a volume, in an object space of an optical acquisition system, occupied by a set of rays of light passing through a pupil of said optical acquisition system and a conjugate of at least one pixel of a sensor of said optical acquisition system said volume occupied by said set of rays of light being called a pixel beam, comprising:
generating a set of data representative of the pixel beam
computing a first rotation angle of a first straight line describing a surface of a hyperboloid of one sheet representing the pixel beam, called first generating ray, around a second straight line being a revolution axis of the hyperboloid, said rotation transforming the first generating ray into a second generating ray crossing a reference straight line,
computing a second rotation angle of a third straight line describing the surface of the hyperboloid, called third generating ray, around the revolution axis of the hyperboloid, said rotation transforming the third generating ray into a fourth generating ray crossing the reference straight line, computing a distance between one of the second or the fourth generating ray and the revolution axis of the hyperboloid,
said set of data comprising the parameters representative of the second generating ray, parameters representative of the fourth generating ray and the distance between one of the second or the fourth generating ray and the revolution axis of the hyperboloid.

2. The method according to claim 1 wherein the reference straight line is parallel to an optical axis of a main lens of the optical acquisition system.

3. The method according to claim 1 wherein the reference straight line is parallel to a central axis of a lens-array of the optical acquisition system.

4. The method according to claim 1, wherein computing the first, respectively the second, rotation angle comprises:
computing coordinates of a vector defining the second, respectively the fourth, generating ray by multiplying a vector defining the first, respectively the third, generating ray with a rotation matrix,
the distance between the second, respectively the fourth, generating ray and the reference straight line being equal to zero since said second, respectively fourth, generating ray and said reference straight line cross each other, computing the value of the first, respectively the second, rotation angle based on the points and vectors defining said second, respectively fourth, generating ray and said reference straight line.

5. The method according to claim 1, wherein the second and the fourth generating rays are sorted, prior to the generation of the set of data representative of the pixel beam, so that the first and the second rotation angles are arranged in increasing order.

6. The method according to claim 1, wherein the computed distance between one of the second or the fourth generating ray and the revolution axis of the hyperboloid is the shortest distance between one of the second or the fourth generating ray and the revolution axis of the hyperboloid.

7. A non-transitory computer readable medium comprising program code instructions that, when executed by a computer, perform the method according to claim 1.

8. An apparatus for generating a set of data representative of a volume, in an object space of an optical acquisition system, occupied by a set of rays of light passing through a pupil of said optical acquisition system and a conjugate of at least one pixel of a sensor of said optical acquisition system said volume occupied by said set of rays of light being called a pixel beam, said apparatus comprising a processor configured to:
generate a set of data representative of the pixel beam by:
computing a first rotation angle of a first straight line describing a surface of a hyperboloid of one sheet representing the pixel beam, called first generating ray, around a second straight line being a revolution axis of the hyperboloid, said rotation transforming the first generating ray into a second generating ray crossing a reference straight line,
computing a second rotation angle of a third straight line describing the surface of the hyperboloid, called third generating ray, around the revolution axis of the hyperboloid, said rotation transforming the third generating ray into a fourth generating ray crossing the reference straight line, computing a distance between one of the second or the fourth generating ray and the revolution axis of the hyperboloid,
said set of data comprising parameters representative of the second generating ray, parameters representative of the fourth generating ray and the distance between one of the second or the fourth generating ray and the revolution axis of the hyperboloid.

9. The apparatus according to claim 8 wherein the processor is configured to compute the first, respectively the second, rotation angle by:
computing coordinates of a vector defining the second, respectively the fourth, generating ray by multiplying a vector defining the first, respectively the third, generating ray with a rotation matrix,
the distance between the second, respectively the fourth, generating ray and the reference straight line being equal to zero since said second, respectively fourth, generating ray and said reference straight line cross each other, computing the value of the first, respectively the second, rotation angle based on the vectors defining said second, respectively fourth, generating ray and said reference straight line.

10. A light field imaging device comprising:
an array of micro lenses arranged in a regular lattice structure;
a photosensor configured to capture light projected on the photosensor from the array of micro lenses, the photosensor comprising sets of pixels, each set of pixels being optically associated with a respective micro lens of the array of micro lenses; and
a device comprising the apparatus of claim 8 for providing metadata comprising the set of data generated in accordance with claim 8.

11. A method for rendering a light-field content comprising:
- computing coordinates of a first straight line being a revolution axis of a hyperboloid of one sheet representing a volume in an object space of an optical acquisition system occupied by a set of rays of light that at least one pixel of a sensor of said optical acquisition system can sense through a pupil of said optical acquisition system, said volume being called a pixel beam, using a distance between said revolution axis of the hyperboloid and a second straight line describing a surface of the hyperboloid, called first generating ray, crossing a reference straight line,
- computing the pixel beam using the coordinates of the revolution axis of the hyperboloid and parameters representative of the first generating ray and parameters of a third straight line describing a surface of the hyperboloid, called second generating ray, crossing the reference straight line,
- rendering said light-field content.

12. A non-transitory computer readable medium comprising program code instructions that, when executed by a computer, perform the method according to claim 11.

13. A device for rendering a light-field content, comprising a processor configured to:
- compute coordinates of a first straight line being a revolution axis of a hyperboloid of one sheet representing a volume in an object space of an optical acquisition system occupied by a set of rays of light that at least one pixel of a sensor of said optical acquisition system can sense through a pupil of said optical acquisition system, said volume being called a pixel beam, using a distance between said revolution axis of the hyperboloid and a second straight line describing a surface of the hyperboloid, called first generating ray, crossing a reference straight line,
- compute the pixel beam using the coordinates of the revolution axis of the hyperboloid and parameters representative of the first generating ray and parameters of a third straight line describing a surface of the hyperboloid, called second generating ray, crossing the reference straight line, and said device further comprising a display for rendering said light-field content.

* * * * *